United States Patent [19]
Check, Jr. et al.

[11] 3,938,095
[45] Feb. 10, 1976

[54] COMPUTER RESPONSIVE POSTAGE METER

[75] Inventors: Frank T. Check, Jr., Orange; Alton B. Eckert, Jr., Norwalk; Bruce E. Hinman, Ridgefield; Howell A. Jones, Jr., Fairfield; Raymond R. Lupkas, Trumbull; Robert B. McFiggans, Stamford, all of Conn.

[73] Assignee: Pitney-Bowes, Inc., Stamford, Conn.

[22] Filed: Oct. 16, 1973

[21] Appl. No.: 406,898

Related U.S. Application Data

[63] Continuation-in-part of Ser. No. 195,694, Nov. 4, 1971, abandoned.

[52] U.S. Cl. ............................................. 340/172.5
[51] Int. Cl.² G06F 15/24; G07B 17/02; G07B 17/04
[58] Field of Search ............ 340/172.5; 101/71, 72, 101/78, 93 C; 194/DIG. 6, DIG. 8, DIG: 9, 4 R; 235/92 AC, 92 CP, 92 FP, 92 CC, 92 DP, 92 GC, 92 PC, 92 TP, 131 R; 83/242

[56] References Cited
UNITED STATES PATENTS

| | | | |
|---|---|---|---|
| 3,039,686 | 6/1962 | Bell et al. | 235/61 PS |
| 3,057,547 | 10/1962 | Adler et al. | 236/101 X |
| 3,107,854 | 10/1963 | Lundquist | 235/101 |
| 3,255,439 | 6/1966 | Simjian | 340/172.5 |
| 3,428,948 | 2/1969 | Simjian | 235/101 X |
| 3,436,530 | 4/1969 | Faude et al. | 235/92 AC |
| 3,566,362 | 2/1971 | Taylor | 340/172.5 |
| 3,688,947 | 9/1972 | Reichenberger | 235/92 AC |
| 3,689,893 | 9/1972 | Taddei | 340/172.5 |
| 3,736,569 | 5/1973 | Bouricius | 340/172.5 |
| 3,744,034 | 7/1973 | Paul | 340/172.5 |
| 3,770,945 | 11/1973 | Dlugos et al. | 101/93 C |
| 3,792,446 | 2/1974 | McFiggins et al. | 340/172.5 |
| 3,823,666 | 7/1974 | Hanson | 235/101 X |

*Primary Examiner*—Harvey E. Springborn
*Assistant Examiner*—Paul R. Woods
*Attorney, Agent, or Firm*—William D. Soltow, Jr.; Albert W. Scribner; Robert S. Salzman

[57] ABSTRACT

A high volume mailing installation is disclosed in which the output of a programmable high speed electronic digital computer provides destination and postage amount information, a high speed chain printer driven by the computer prints the destination information on address labels, and an authorized postage printing meter is mounted piggy-back fashion on the chain printer and responds to the same computer for automatic printing of authorized postage impressions of the calculated amount on the same mailing labels. The meter includes a fast, rugged solenoid-actuated segmented flat bed postage printer unit and fixed-program electronic digital postal accounting circuitry, with appropriate security features to prevent or detect postal fraud.

4 Claims, 38 Drawing Figures

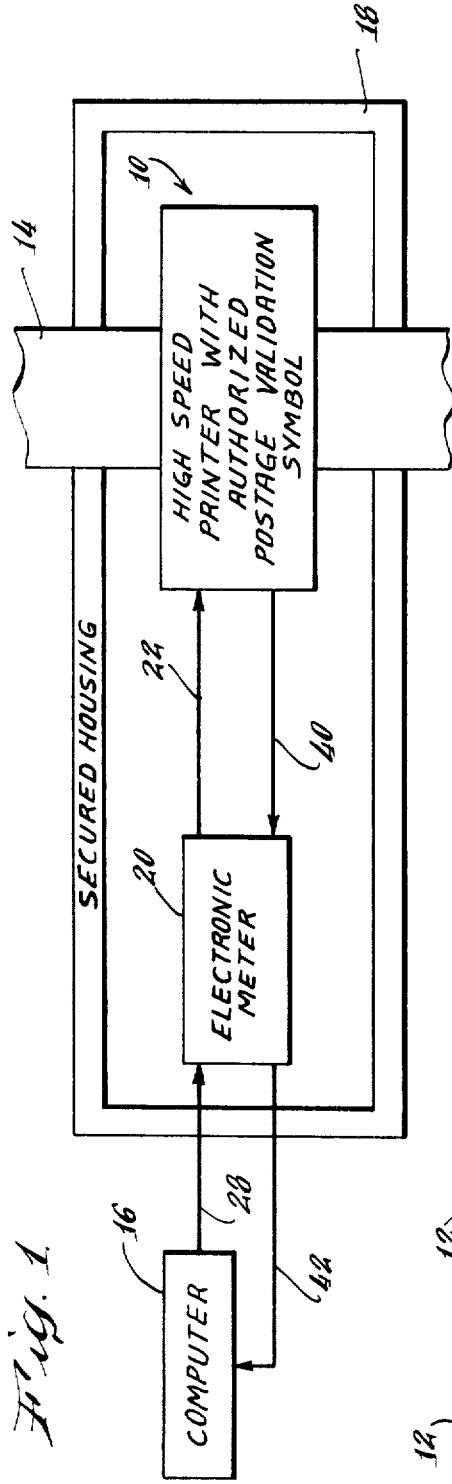
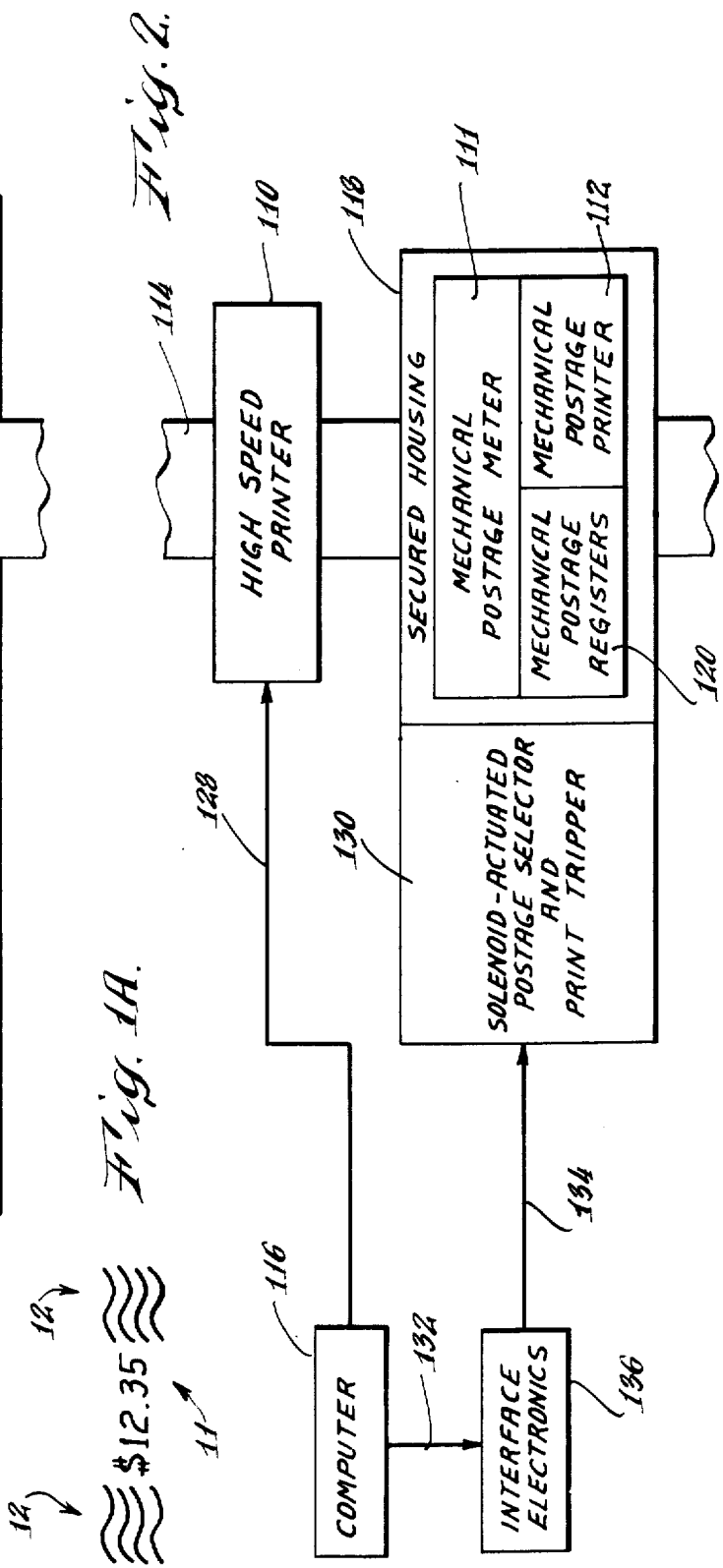

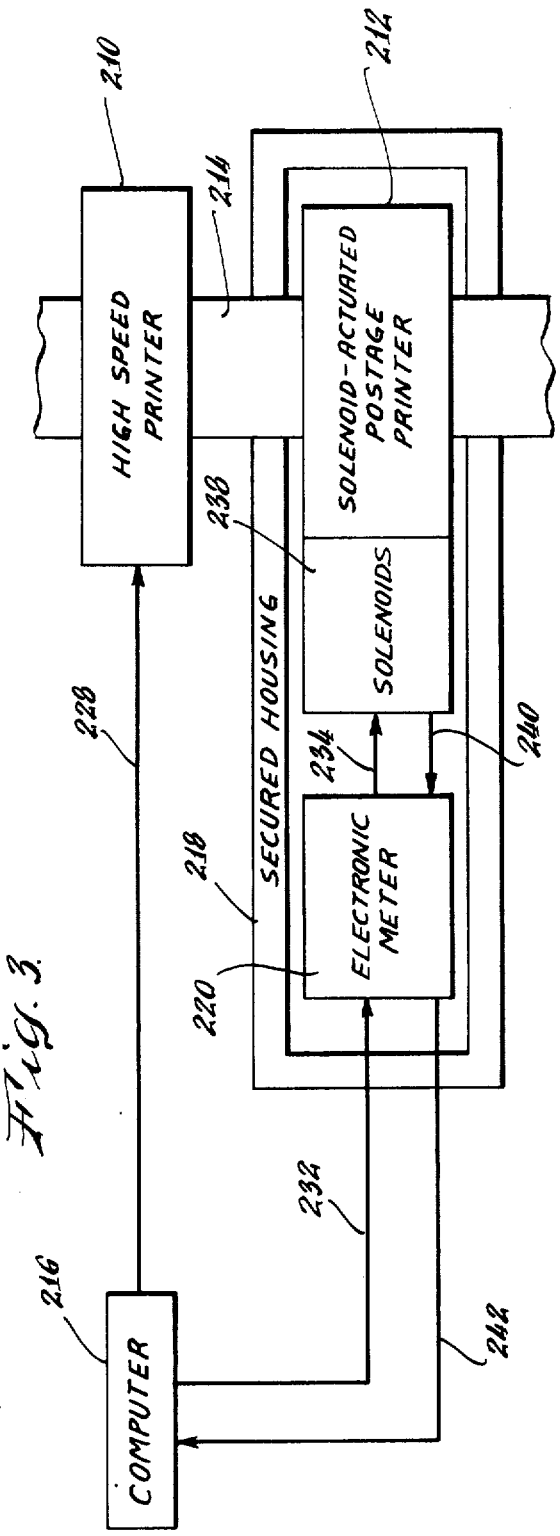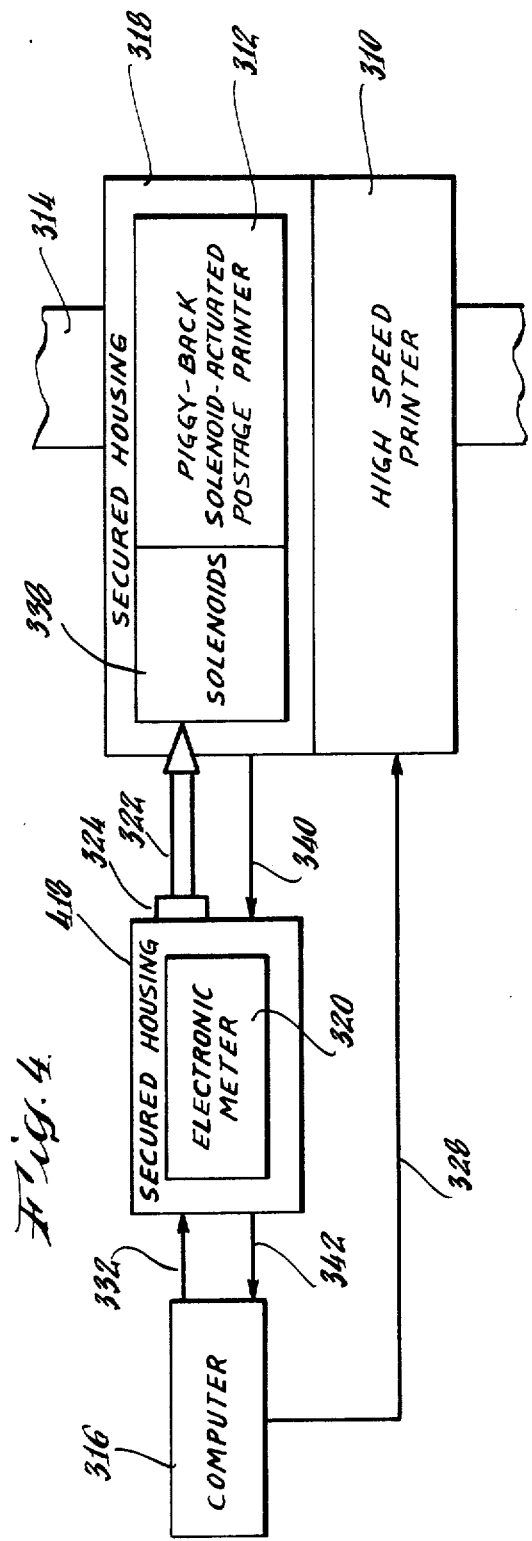

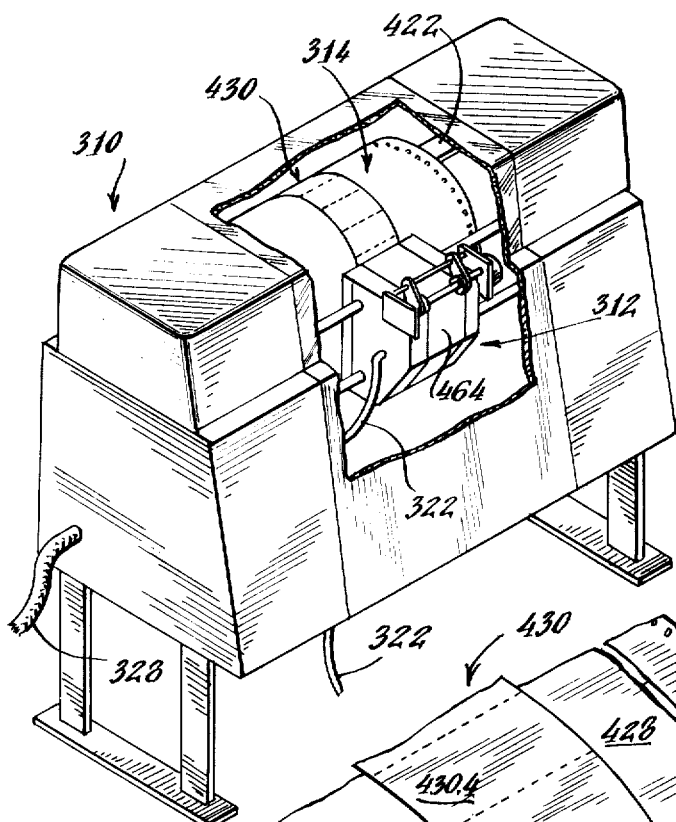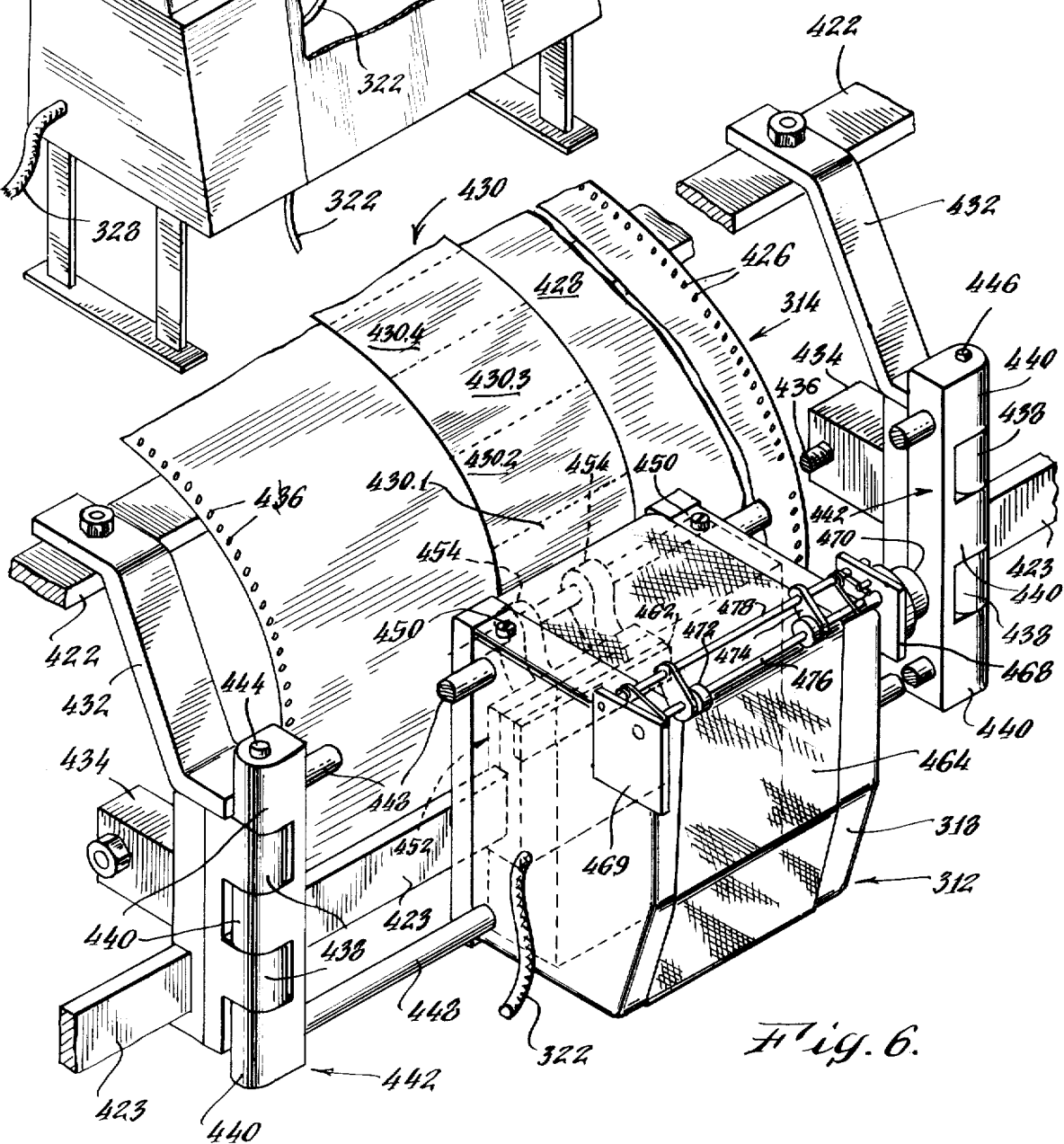

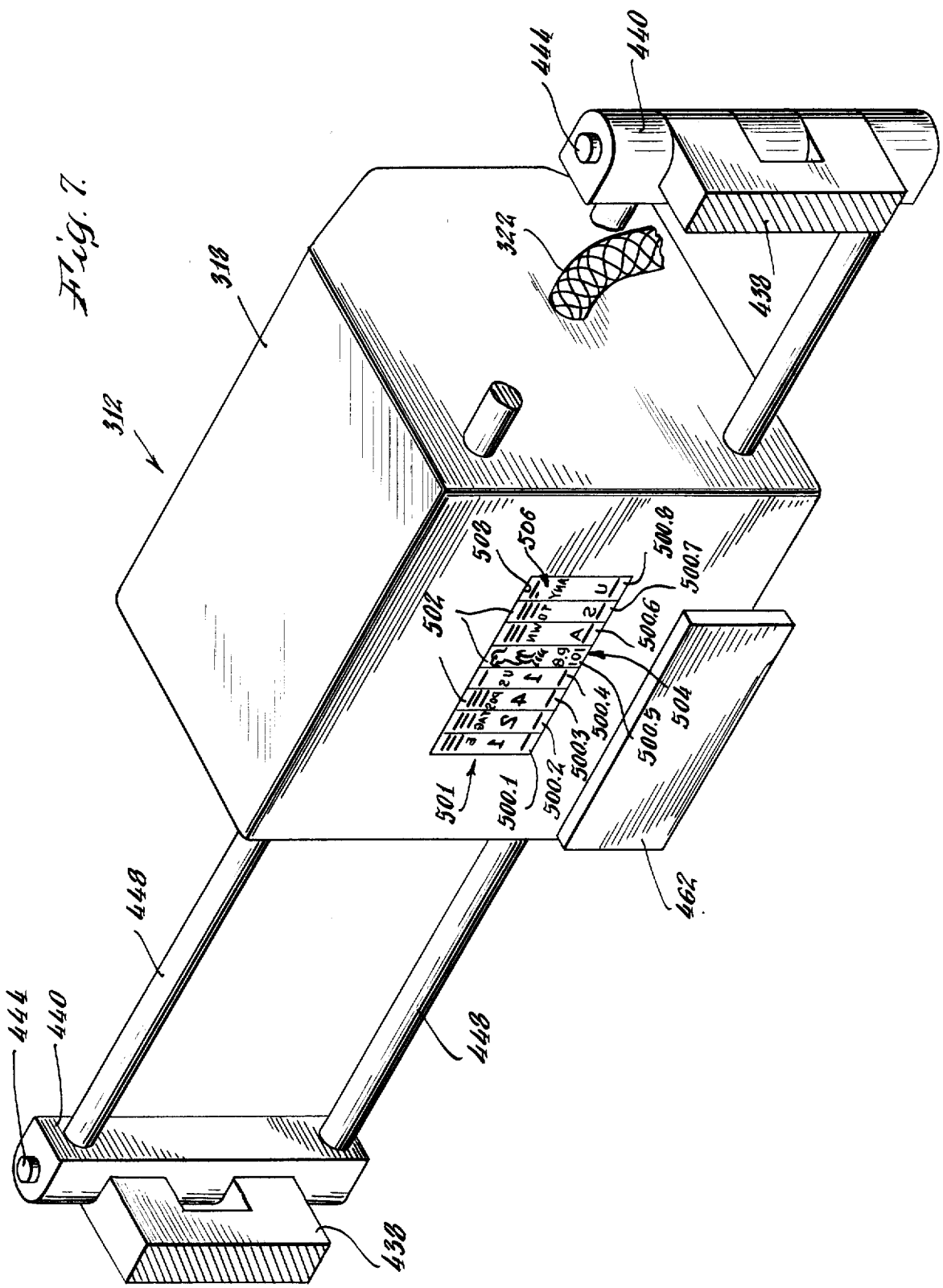

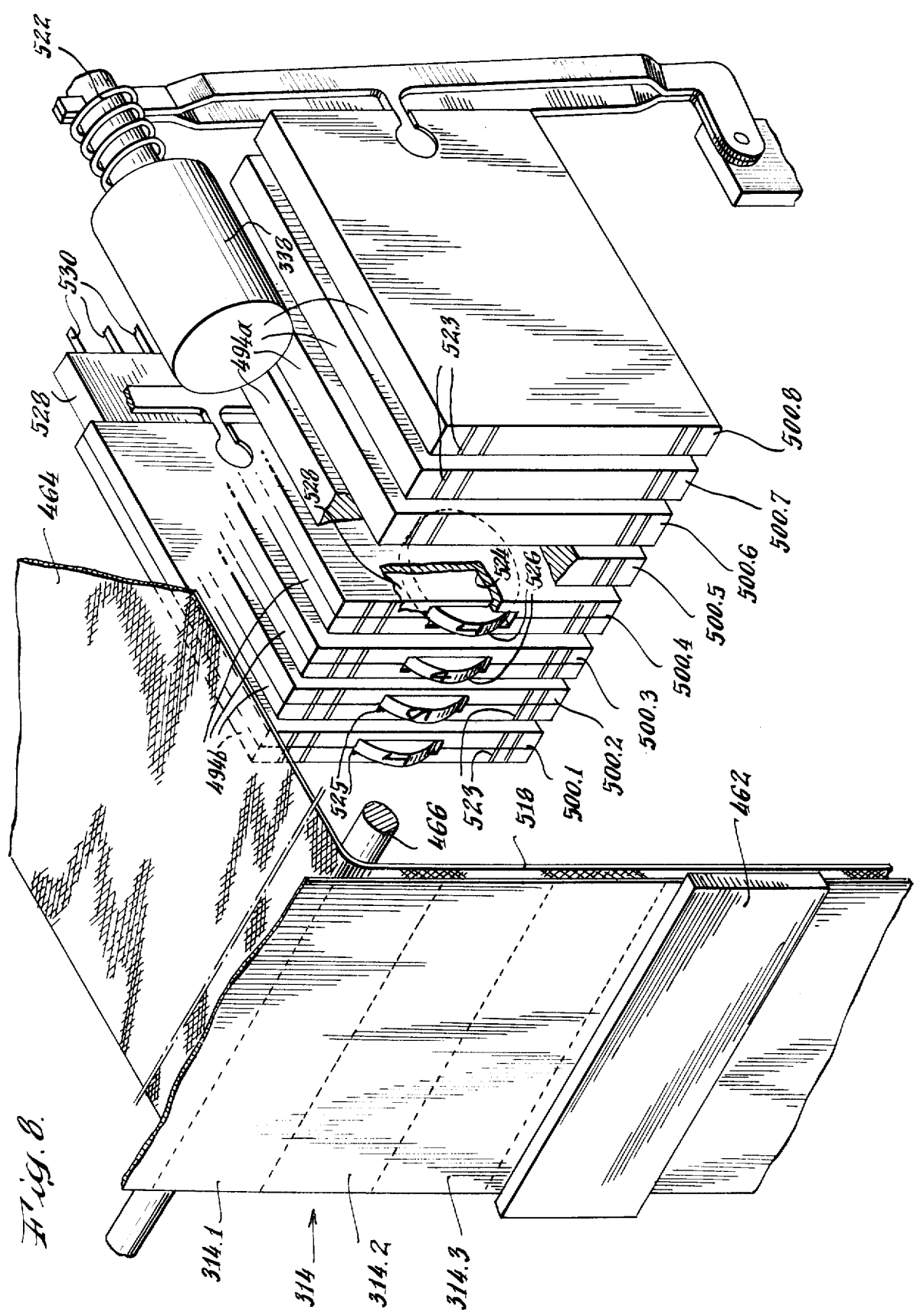

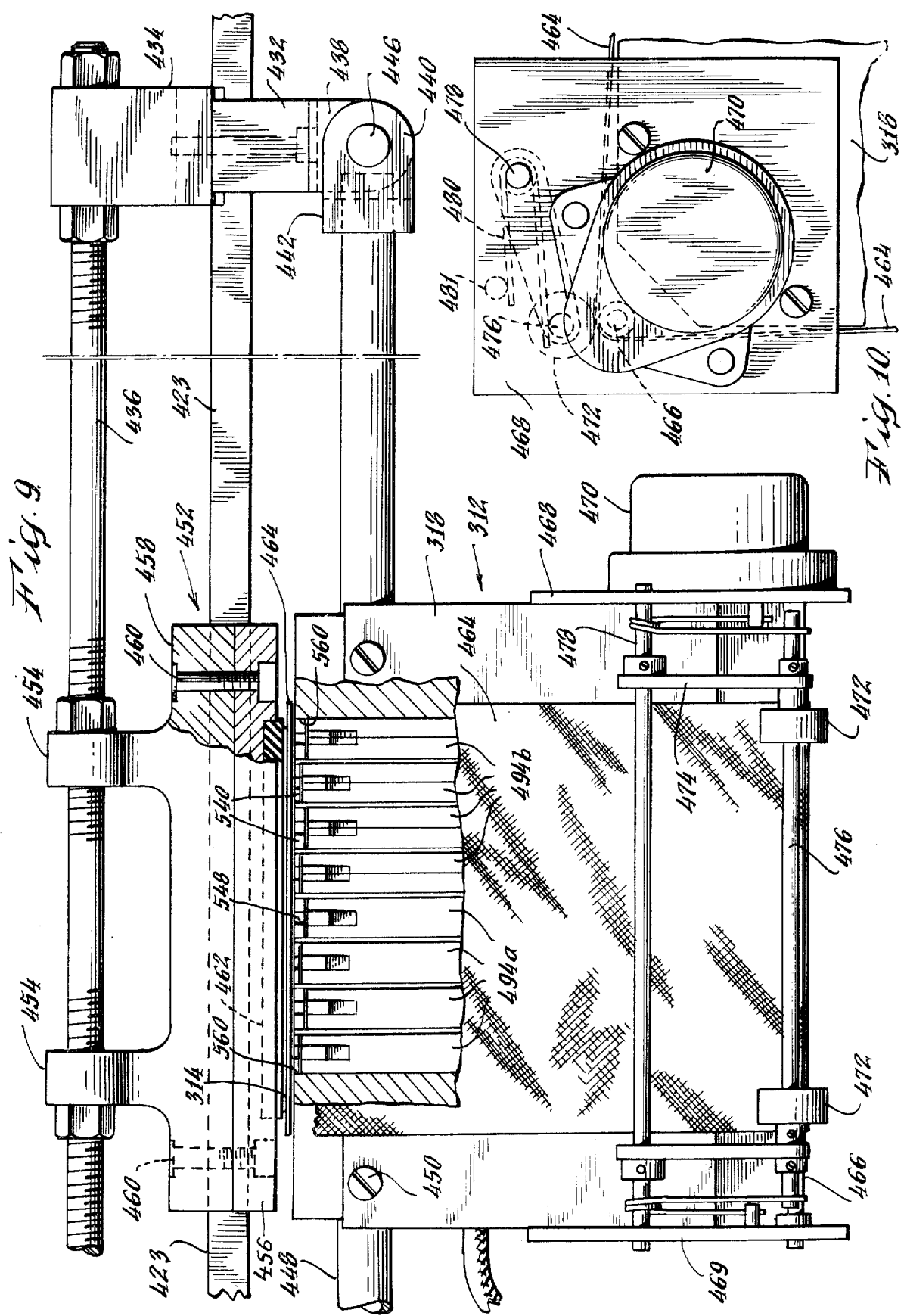

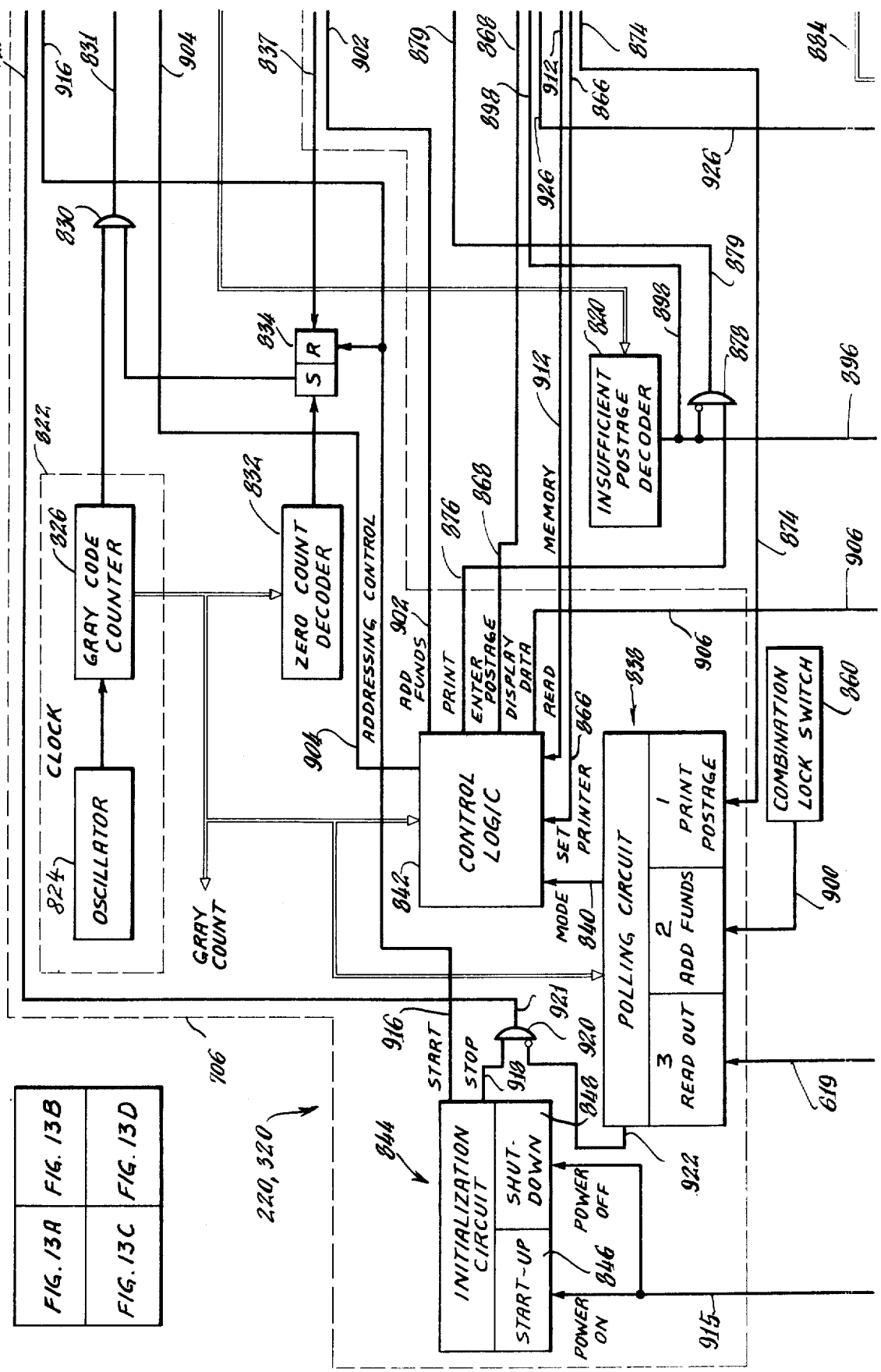

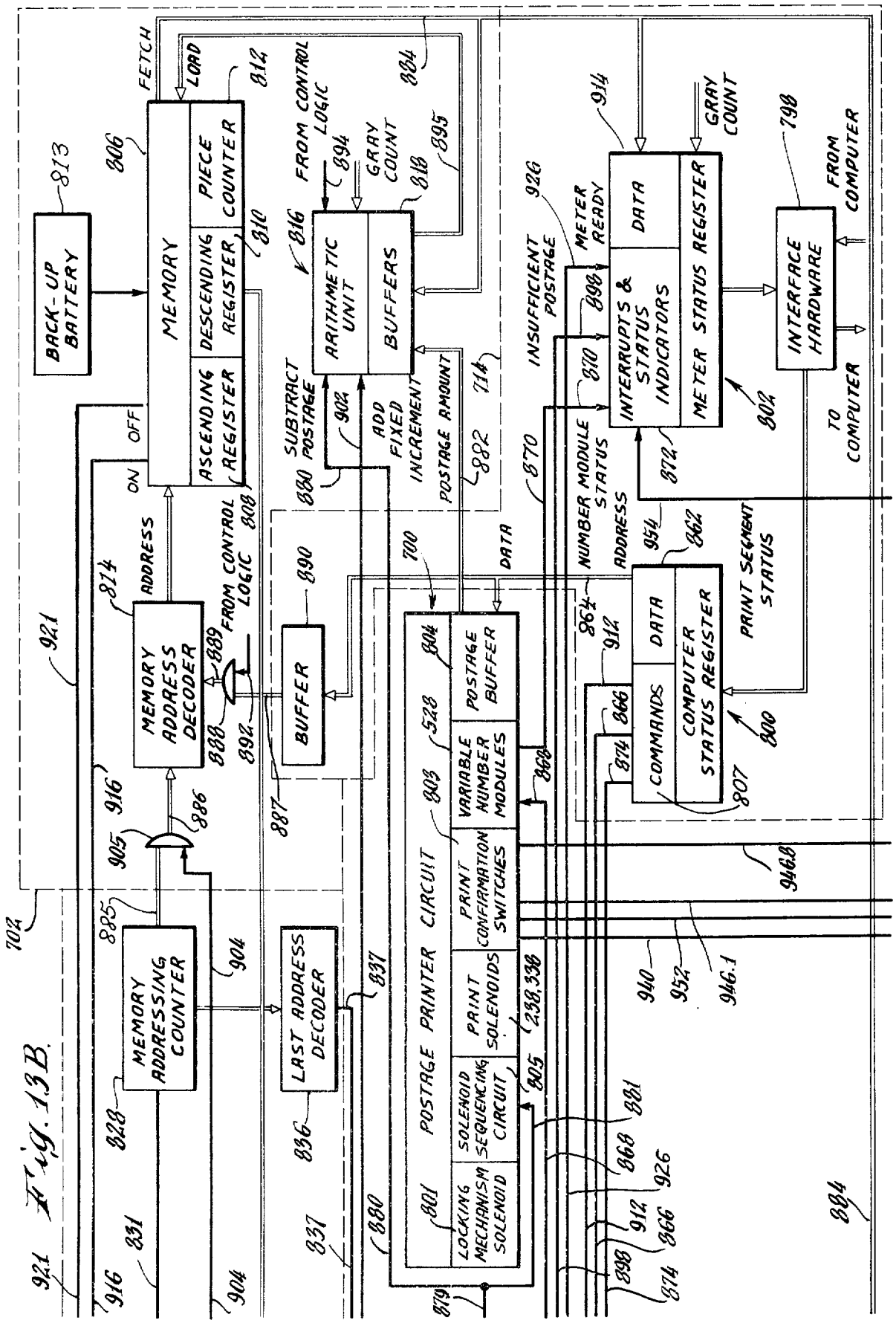

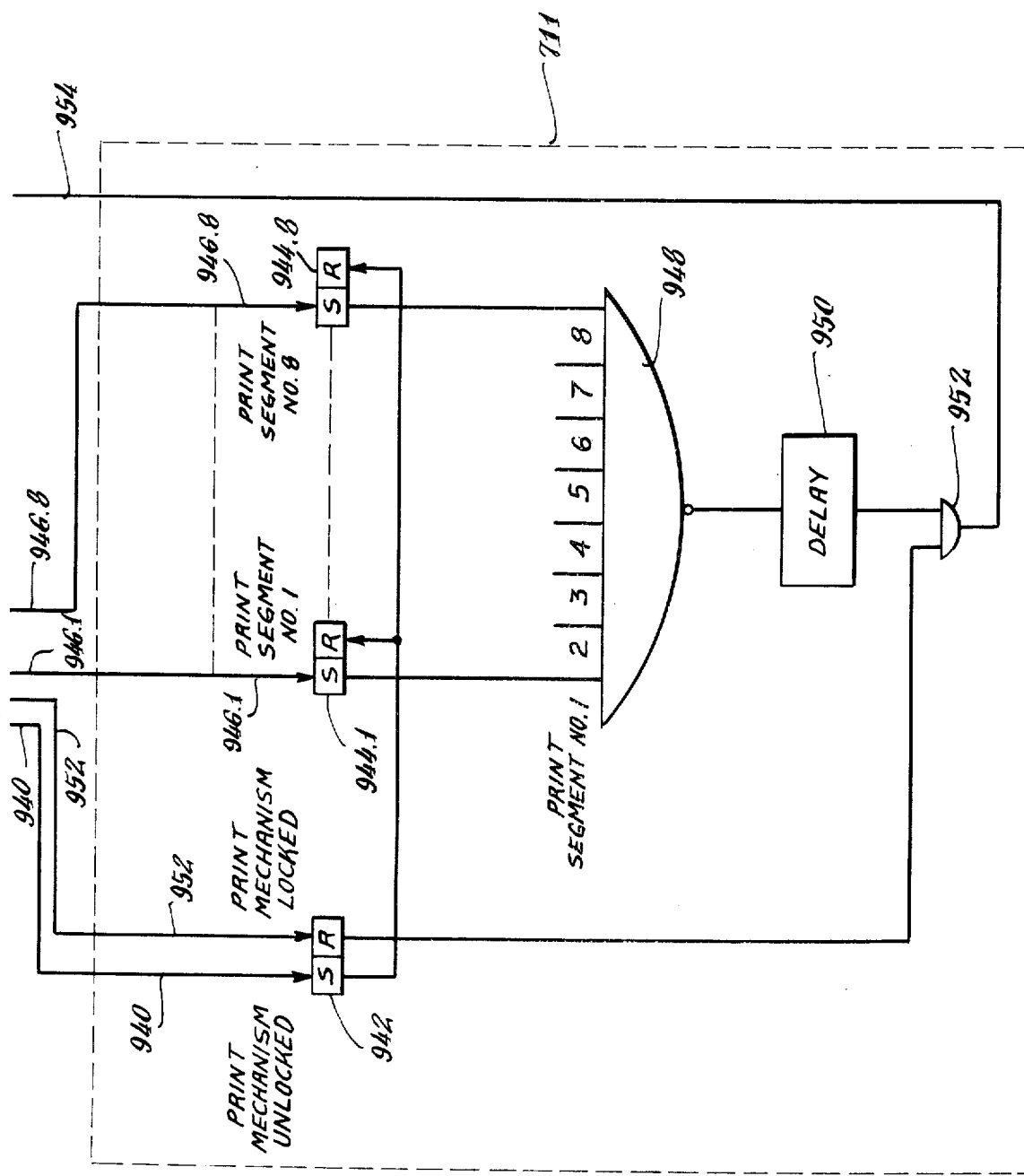

PLOT OF CLOCK, GRAY CODE COUNTER, AND
CLOSELY RELATED CONTROL SIGNALS VERSUS TIME

PLOT OF SYNCHRONOUS COUNTER
SIGNALS VERSUS TIME

| ADDRESS E D C B A | | | | | ENTER POSTAGE | ADD FUNDS | CYCLE |
|---|---|---|---|---|---|---|---|
| 0 0 0 0 0 | | CENTS | | | | | |
| 0 0 0 0 1 | | TEN CENTS | | | | | |
| 0 0 0 1 0 | | DOLLAR | | | | | |
| 0 0 0 1 1 | ASCENDING REGISTER | $10 | | | ADD POSTAGE AMOUNT | ADD ZERO | ADD ZERO |
| 0 0 1 0 0 | | 100 | | | | | |
| 0 0 1 0 1 | | 1,000 | | | | | |
| 0 0 1 1 0 | | 10,000 | | | | | |
| 0 0 1 1 1 | | 100,000 | | | | | |
| 0 1 0 0 0 | | 1,000,000 | | | | | |
| 0 1 0 0 1 | | 10,000,000 | | | | | |
| 0 1 0 1 0 | | | | | | | |
| 0 1 0 1 1 | | | | | | | |
| 0 1 1 0 0 | | | | | | | |
| 0 1 1 0 1 | | | | | | | |
| 0 1 1 1 0 | | | | | | | |
| 0 1 1 1 1 | | | | | | | |
| 1 0 0 0 0 | | CENTS | | | | | |
| 1 0 0 0 1 | | TEN CENTS | | | | | |
| 1 0 0 1 0 | | DOLLAR | | | | | |
| 1 0 0 1 1 | DESCENDING REGISTER | $10 | | | SUBTRACT POSTAGE AMOUNT | ADD FUNDS | ADD ZERO |
| 1 0 1 0 0 | | 100 | | | | | |
| 1 0 1 0 1 | | 1,000 | | | | | |
| 1 0 1 1 0 | | 10,000 | | | | | |
| 1 0 1 1 1 | | 100,000 | | | | | |
| 1 1 0 0 0 | | 1 | | | | | |
| 1 1 0 0 1 | | 10 | | | | | |
| 1 1 0 1 0 | | 100 | | | | | |
| 1 1 0 1 1 | PIECE COUNTER | 1,000 | | | ADD ONE | ADD ZERO | ADD ZERO |
| 1 1 1 0 0 | | 10,000 | | | | | |
| 1 1 1 0 1 | | 100,000 | | | | | |
| 1 1 1 1 0 | | 1,000,000 | | | | | |
| 1 1 1 1 1 | | 10,000,000 | | | | | |

ADDRESS ALLOCATION AND ARITHMETIC UNIT FUNCTIONS

FIG. 16

COMPUTER RESPONSIVE POSTAGE METER

RELATED APPLICATIONS

This application is a continuation-in-part of the previously filed parent application Ser. No. 195,694 now abandoned.

FIELD OF THE INVENTION

This invention relates generally to postage metering, and particularly concerns secured electronic calculating and postage printing equipment for achieving postage metering security in a computer-controlled high volume mailing operation.

BACKGROUND AND SUMMARY OF THE INVENTION

It is conventional for high volume mailers to avail themselves of the high speeds offered by modern electronic digital computers and chain printers, in order to reduce costs and increase their output. A typical prior art installation includes a computer which receives information as to the weight and destination of a package, and is programmed to calculate the required postage. A high speed computer output printer is slaved to the computer to print out the destination information on an address label which is subsequently affixed to the package.

The computer also provides the calculated postage amount information to shipping department employees in some form which enables them to affix the proper amount of postage to the package. The most common way of accomplishing this is for the high speed printer to receive the postage amount information from the computer, and print it directly on the address label for the information of the employees who subsequently affix postage. This printing is not an actual government-authorized postage impression of the kind provided by a postage meter. The print impression made in a prior art installation as described above includes only the postage amount without any authorized postage validation symbols, and is provided for information only. Thereafter authorized postage of like amount must be affixed by an employee by affixing postage stamps or using a conventional manually controlled mechanical postage meter.

The intervention of a human being, 3,255,439 of a mechanical postage metering device, slows down a high volume mailing operation of the kind described. Therefore it is desirable to have the authorized postage impression printed automatically in response to the computer-generated postage calculation. It is not enough, however, simply to connect the data output lines of the computer, to the input of some insecurely housed apparatus capable of printing authorized postage impressions, as suggested by U.S. Pat. No. 3,225,439 of L. G. Simjian. In accordance with applicable postal security regulations, there must be some secure means of accounting which assures postal officials that all the postage used is paid for. Normally a descending register is filled with a pre-paid postage credit balance, the register is decremented by the amount of postage dispensed, and the postage dispenser is locked when the postage balance falls too low. Subsequently the register can be recharged under secured conditions. It is also possible to extend postage credit to the user, keeping track of a debit balance which increases by the amount of the postage used, and billing the user subsequently. Those skilled in the computer arts will readily appreciate that it is possible to program the computer itself to take care of either type of bookkeeping described above. Such a solution is unsatisfactory, however, because digital computers are so easily re-programmed that an unscrupulous individual could thereby accomplish postal fraud.

This invention contemplates, therefore, that the desired computer control of postage printing be achieved in conjunction with some form of secure, fixed-program postal accounting equipment. One approach which is within the contemplation of this invention is to use a mechanical postage meter which comprises a secure housing containing authorized postage printing means, a mechanical descending register for storing the postal credit balance, and mechanical guaranteeing for gauranteeing that all printed postage amounts are decremented from the register, all of which is conventional. The mechanical meter is modified in accordance with this invention, however, to provide it with an electrically actuated meter controller device connected to respond to electrical signals from the computer, and to translate those signals into a mechanical input for controlling all meter functions. (A system using a lever and clutch mechanism in an electrically actuated meter is shown in U.S. Pat. No. 3,692,988).

The latter approach meets all security requirements, but is considered too slow to meet the speed requirements of some high volume mailing operations. When used in conjunction with an electronic digital computer and high speed printer, it may be necessary for the postage printer to produce approximately two or three postage impressions per second, and mechanical postage meters do not appear capable of withstanding such operating rates over a reasonable lifetime.

In order to achieve longer operating lifetimes and/or higher operating speeds, a preferred form of the invention employs fast-acting electrically driven printing means, electrical means for storing the postage balance, and electrical calculating means for changing the postage balance in accordance with the amount of postage printed. The postage printing means is enclosed within a secure housing, and the electronic control circuitry, or at least that portion of it which bears the responsibility for postal security, is enclosed within the same housing or alternatively is in a separate secure housing and connected to the postage printer by means of secure electrical cable and connector devices.

Equipment in accordance with this aspect of the invention can be used for printing various different kinds of numerical indicia under computer control. For example it is adapted for various non-postage applications having similar security problems, e.g. printing paychecks.

It is also within the contemplation of this invention to provide appropriate security means which make it practical to use a high speed printer directly for postage printing, after appropriate modifications such as replacing standard print characters by special authorized postage symbols.

That approach, however, has a number of disadvantages, one of which relates to the character size limitation of standard high speed printing equipment. It also involves undesirable interference with the electrical interface between the computer and the high speed printer, i.e. breaking into the electrical cable which connects the computer and the high speed printer in order to insert special circuitry for performing postal security functions.

Therefore a preferred form of this invention provides a separate auxiliary printing mechanism which is arranged in one of several ways to print authorized postage impressions upon the address labels that are fed through the high speed printer. The high speed printer and the postage printer are both controlled ultimately by the computer, but they have individual electrical connections thereto, and therefore, only the connection to the postage printer need be designed with postal security problems in mind.

BRIEF DESCRIPTION OF THE DRAWINGS

FIG. 1 is a block diagram of a computer-responsive authorized postage printing system in accordance with one embodiment of this invention, wherein an otherwise conventional high speed computer output printer is modified to print an authorized postage symbol, and is connected to so under control of an electronic postage metering circuit connected between the computer and the printer.

FIG. 1A is an illustration of an authorized postage impression made by the apparatus of FIG. 1.

FIG. 2 is a block diagram of an alternative embodiment of a computer-responsive authorized postage printing system in accordance with this invention, in which a self-contained mechanical postage meter is arranged to print upon the same paper web as a computer-driven high speed printer, and an automatic meter controller accepts computer instructions in electrical form and translates them into a mechanical input to the postage meter.

FIG. 3 is a block diagram of another alternative embodiment of a computer-responsive authorized postage printing system in accordance with this invention, which uses a separate electrically actuated postage printer and electrical postal accounting equipment. Both the postage printer and at least that portion of the electronic circuitry which has responsibility for postal accounting are contained within a common secure housing.

FIG. 4 is a block diagram of still another alternative embodiment of a postage printing system in accordance with this invention, in which electronic metering circuitry and an electrically actuated authorized postage printer are enclosed in separate secured housings and connected by a secured cable and secured electrical connector means. The postage printer is mounted piggy-back fashion upon a high speed computer output printer.

FIG. 5 is a perspective view of an exemplary physical realization of a high speed printer and piggy-back postage printer mounted thereon, as illustrated in FIG. 4.

FIG. 6 is an enlarged perspective view of the piggy-back postage printer and the supporting structure for mounting it on the high speed printer.

FIG. 7 is another perspective view of the piggy-back postage printer.

FIG. 8 is a perspective view of the printing mechanism of the piggy-back postage printer.

FIG. 9 is a top plan view, with parts broken away and sectioned for clarity of illustration, of the piggy-back printer.

FIG. 10 is an elevation view of the ribbon advance mechanism of the piggy-back printer.

FIGS. 13A through 13D comprise a more detailed block diagram of the same circuitry, when fitted together as shown in FIG. 13E.

FIGS. 14 through 34 depict a more detailed view of the circuitry of FIG. 13, and associated timing and addressing diagrams for this circuitry.

FIG. 14 shows a diagram including a plot of the clock, gray code counter polling the polling signals with respect to time.

FIG. 15 depicts a diagram of the addressing signals plotted with respect to time.

FIG. 16 illustrates a table of address allocation and arithmetic unit functions.

FIG. 17 shows a circuit diagram for the gray code counter and the memory addressing counter.

FIG. 18 depicts a circuit diagram for the polling circuit, the last address decoder and the combination lock switch.

FIG. 19 illustrates a diagram of part of the control logic circuitry.

FIG. 20 shows a diagram of the memory circuit.

FIG. 21 depicts a diagram of the memory address decoder and memory input buffer circuitry.

FIG. 22 illustrates a diagram for the arithmetic unit circuitry and memory output buffer circuitry.

FIG. 23 shows a diagram for the insufficient postage decoder circuit, part of the interrupts and status indicator circuit and the arithmetic control circuit.

FIG. 24 depicts a diagram for postage buffer circuitry. FIG. 25 illustrates a diagram of the print buffer circuitry.

FIG. 26 shows a diagram for variable print module control circuitry and Binary Coded Decimal error detection circuitry.

FIG. 27 depicts a diagram of the print wheel logic circuitry.

FIG. 28 illustrates a diagram of the interfacing circuitry of the computer for this system.

FIG. 29 shows a diagram of the meter status circuitry.

FIG. 30 depicts a diagram for the memory power supply and voltage sensing circuits.

FIG. 31 illustrates a diagram of the control power supply and initialization circuitry.

FIG. 32 shows a diagram of the display switching control circuit.

FIG. 33 depicts a diagram of the display logic control circuitry; and

FIG. 34 illustrates a diagram of the direct memory read control logic circuitry.

DETAILED DESCRIPTION OF THE PREFERRED EMBODIMENT

Figure 11:
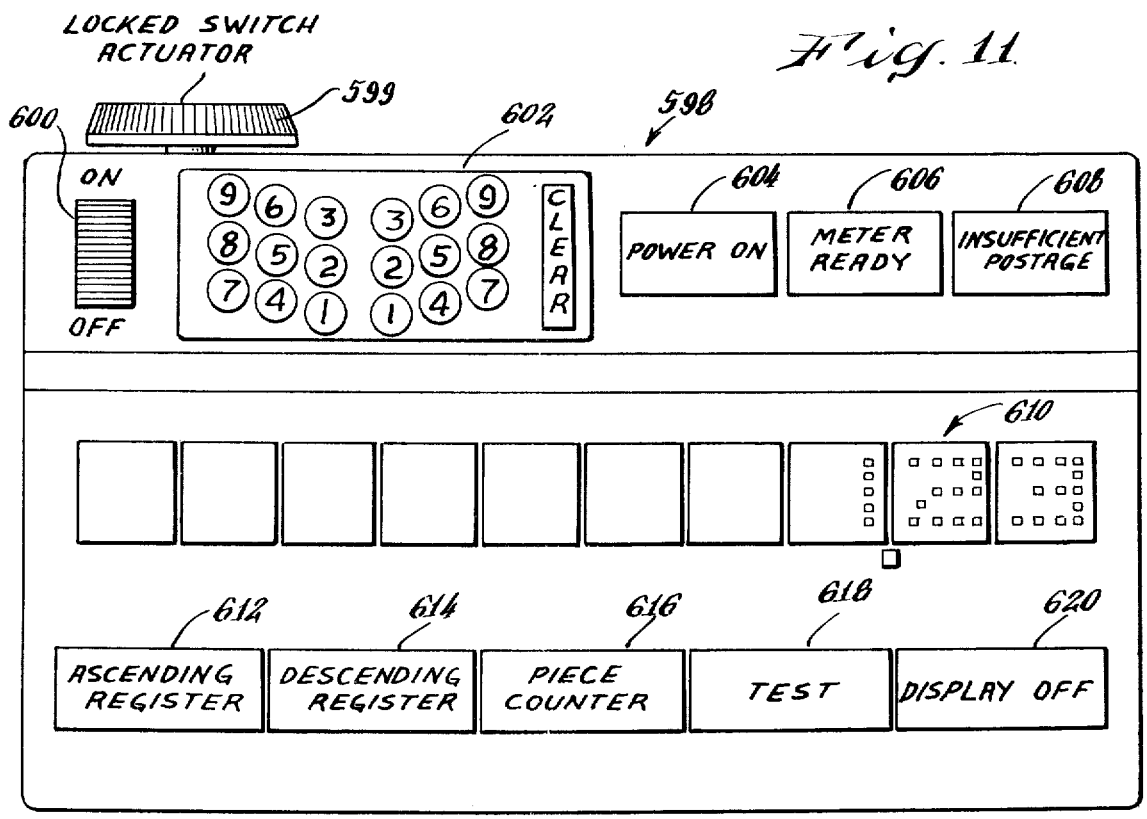
FIG. 11 is a front elevational view of the control panel of the electronic meter of FIGS. 3 of 4.

In FIG. 1 reference numeral 10 generally designates a high speed computer output printer, for example a chain printer such as the IBM Model 1403. The printer 10 is conventional in every respect, except that it is modified to include a type element for printing an authorized postage validation symbol. A web of mailing label paper 14 is pulled through the high speed printer during printing by means of the conventional paper tractor mechanism (not indicated), and the printer is capable of printing thereon both conventional alphanumeric symbols and the authorized postage symbol on command of a conventional programmable electronic digital computer 16.

In modifying the high speed printer 10 to include the authorized postage validation symbol, one of the less frequently used conventional symbol print elements may be easily removed from the printing chain and replaced by a validation symbol print element. As printed by the modified chain printer 10, an authorized postage impression would appear as illustrated in FIG. 1A. This postage impression includes a dollar postage amount 11 and a pair of authorized postage symbols 12 before and after it. The postage amount 11 is printed by the conventional type elements used for general electronic data processing print-out purposes, and the validation symbols 12 are printed by the special substitute type element.

The computer 16 is programmed to receive destination and package weight information, and from that information to calculate the amount of postage 11. Then the computer 16 transmits signals to the high speed printer 10 which cause it to print the address (not shown) and the calculated amount of postage 11 on the paper web 14, using conventional alphanumeric type elements. In addition, the printer 10, upon receiving an appropriate signal from the computer 16, prints the postage symbols 12 adjacent the postage amount 11 to validate the latter as an authorized postage impression.

The paper web 14 is designed to be separated into individual mailing labels and then attached to individual packages for mailing purposes, as is presently conventional in high volume mailing operations.

The high speed printer 10 is enclosed within a secured housing 18, along with an electronic postage metering circuit 20 which stores postal accounting information, recognizes the amount of postage calculated by the computer, and makes sure that the postage balance is altered by the amount of postage 11 every time that a computer instruction is sent to printer 10 for printing of the authorized postage validating symbol 12. The purpose of secured housing 18 is to make sure that no such command can reach the high speed printer 10 to cause it to print the authorized postage validating symbol 12 without an appropriate change in the postal accounting balance of circuit 20. To accomplish this, the secured housing 18 prevents access to the metering circuit 20 and the high speed printer 10.

The term "secured housing" as used herein means a housing which either cannot be opened by unauthorized persons or cannot be opened by such persons without detection, or without engaging in counterfeiting. An example of a secured housing which is preferred for use with the present invention is the type which is currently employed in conventional mechanical postage meters. Such a housing cannot be opened without cutting a security closure which is protected by a lead seal having an authorized government impression thereon. Therefore in order to have access to the postage balance register of such a postage meter, a postage thief would either have to counterfeit the seal or leave behind telltale alterations of the security closures.

The electronic meter 20 must be inserted into the electrical path between the computer 16 and high speed printer 10, because the computer must not be permitted to send any control signals to the high speed printer which are not monitored by the postage metering circuit 20. Otherwise, a dishonest computer programmer could easily redesign software so that computer 16 could access the authorized postage validating symbol 12 on the high speed printer 10 without causing the meter 20 to alter the postage balance by the proper amount. If every computer instruction reaching the high speed printer 10 passes through the meter 20, however, there will be an appropriate change in the postage balance for every postal amount printed.

The need for splicing the electronic meter 20 into the cable 28 leading to the high speed printer 10 is, however, a disadvantage of the embodiment of FIG. 1. Both the manufactures and renters of computer installations frown upon the splicing of foreign circuits into the data cables between computers and peripheral equipment. Such splicing might also avoid various performance guarantees, since the manufacturers do not wish to be responsible for malfunctions that could conceivably have been caused by the foreign circuits.

Another disadvantage of the approach illustrated in FIG. 1 is the fact that it causes difficulties for service personnel who maintain the printer 10 and meter 20. When repairs are required which necessitate opening the secure housing 18, special arrangements must be made with the postal authorities. The housing 18 may be designed to permit loading of paper 14, however, and other normal operating procedures, without the need for opening the housing or special supervision by postal authorities. For example, the paper 14 may be fed in through an opening in the housing 18 which is too small to permit tampering with the metering circuit 20 and electrical connection 22.

Another disadvantage of the FIG. 1 embodiment relates to the fact that conventional high speed printer design places an upper limit on the size of type elements which can be used therein. Consequently the special postage validating symbol 12 may be too small for maximum visibility to postal employees handling the mail.

An alternative embodiment of the invention which avoids these problems is seen in FIG. 2. There a computer 116 is connected by an uninterrupted cable 128 directly to a totally conventional, unmodified high speed printer 110. No foreign equipment is connected electrically to the printer, and there are no changes in its type elements. A conventional mechanical authorized postage metering and printing device 111 similar in internal design to mechanical postage meter devices that are in common use today, is installed near the high speed printer 110, and is arranged to print on the same continuous web of paper 114 as the high speed printer. The device 111 includes a mechanical postage printer 112 and mechanical postage registers 120 enclosed in a conventional secured housing 118.

The mechanical postage meter and printing device 111 may be located either upstream or downstream from the high speed printer 110, relative to the direction of paper motion. The placement of the mechanical postage meter 111 in relation to the direction of paper motion determines whether the postage impression is printed before or after the address information printed by the high speed printer 110. In either case, the computer 116 is programmed to take account of the difference in location between the high speed printer and the postage printer, and actuates them in the appropriate time relationship, so that the matching address and postage amount are printed on the same mailing label, i.e. the same region of paper web 114. The meter and printer device 111 of this embodiment differs from conventional mechanical postage meters in that selecting the amount of postage and tripping the print mechanism is accomplished by a solenoid-actuated mechanism 130, instead of manually. (See U.S. Pat. No. 2,692,988). The solenoid-actuated mechanism in turn is driven by electrical signals coming over leads 132 and 134 from the computer 116 and additional electronic hardware 136 which may be required to interface the computer with the postage meter actuating solenoids.

A disadvantage of the embodiment illustrated in FIG. 2 is that it is difficult to design a mechanical postage meter and printer device which can operate at speeds compatible with a high speed printer and electronic digital computer, unless the postage amount remains fixed between printing impressions. Two types of mechanical postage printers, both motor-driven, are commonly employed in this type of meter. One of these, the rotary type, cannot develop a great enough angular velocity without introducing dynamic problems; and the other type, the flat bed printer, has so much mass for the motor to accelerate all at once that is unsuitable for high speed operation. In addition, the rotating mechanical type of register mechanisms which are used for postage accounting in mechanical meters are not capable of high operating speeds. These factors slow down the print cycle of conventional postage meters to such an extent that insufficient time is left for changing the postage under wheels, if the mailing labels are to be printed at a rate compatible with electronic data processing equipment.

In order to achieve such compatibility, preferred embodiments of the invention, illustrated in FIGS. 3 and 4 respectively, are designed to employ low inertia segmented flat bed postage printing mechanism driven directly by solenoids for high speed electrical actuation, and electronic digital techniques for high speed postage accounting.

In the embodiment of FIG. 3 a solenoid-actuated authorized postage printer 212 and an electronic postage metering circuit 220 are both contained within a secured housing 218. The electronic meter 220 operates in response to the postage calculations performed by a computer 216, as represented by the arrow 232, and, as indicated by the arrow 234, drives solenoids 238 which cause the mechanism 212 to print a postage impression. The solenoid-actuated printer 212 acts on the same paper web 214 as a computer-responsive high speed printer 210, which is directly responsive to the computer 216 as indicated by the arrow 228.

An advantage of the embodiment of FIG. 3 is that no secured electrical connectors or cables are required, since the security-sensitive electronic circuitry is enclosed within the same secured housing 218 as the postage printer 212. But a disadvantage of the embodiment of FIG. 3 is that putting the digital circuitry 220 within the same housing as the solenoids 238 exposes the digital circuitry to electrical noise.

The approach illustrated in FIG. 4 avoids the electrical noise problem, and is most highly preferred. In this embodiment a solenoid-actuated postage printer 312 and its actuating solenoids 338 are enclosed in a first secured housing 318, while electronic metering circuitry 320 is enclosed in a separate secured housing 418 and connected to the solenoids 338 by a secured electrical cable 322 and secured connector 324. "Secured electrical connectors are cables" are defined as those which cannot be disconnected by unauthorized persons or cannot be disconnected by such persons without leaving traces or requiring counterfeiting. Connectors of this type are commercially available. See for example the XAC series of connectors made by Winchester Electronics of Oakville, Connecticut; these connectors have housings which are assembled by pairs of threaded fasteners having diametral holes. If a wire is passed through the diametral holes of both fasteners, and the ends of the wire are secured together by a lead seal having a government authorized impression, the threaded fasteners cannot be turned to disassemble the connector without violating the seal. Secured electrical cables are also commercially available; they are simply conventional conductor cables electrically shielded by a braided metal wire sheath, and the internal electrical conductors are connected to terminals inside the secured concector 324, which prevents anyone from disconnecting the cable 322 from the secured connector without dissassembling the secured connector. The other end of the cable 322 is similarly connected inside the secured housing 318.

The metering circuitry 320 is effectively isolated by the metal housings 318 and 418 from electrical noise generated by the solenoids 338, yet a secured electrical relationship between the meter and the printer 312 is maintained. In this embodiment, a computer 316 provides calculated postage amount data to the electronic meter 320 as indicated by the arrow 332. The meter 320 has exclusive control over the print solenoids 338 by virtue of the second connection, and will not permit any amount of postage to be printed without simultaneously effecting a corresponding change in the electronically stored postage balance. Here again, the postage printer 312 and a high speed printer 310 act upon the same web of paper 314 in a known time relationship. The high speed printer 310 responds to instructions from the computer 316, as indicated by arrow 328.

An advantageous feature shared by the embodiments of FIGS. 1, 3 and 4 is that through the use of electric digital techniques, useful feedback information is available from the postage printers 10, 212 and 312 to the electronic metering circuits 20, 220 and 320, and to the computers 16, 216 and 316, as indicated by the output arrows 40, 42 and 240, 242 and 340, 342 respectively. As a result, the computer can be advised of any error conditions existing in the postage printer before printing occurs. The computer then can take appropriate remedial steps as has been programmed. Such error conditions will be discussed more fully below, in connection with the specific electronic meter circuitry illustrated in FIGS. 12 and 13.

Because the embodiment in FIG. 4 separates the printing components 312 and 338 from the electronics 320, it facilitates mounting the printer 312 and actuating solenoids 338 in piggyback fashion atop the high speed printer 310, as symbolized schematically in FIG. 4 by the placement of the housing 318 directly over the printer 310. Such piggy-back placement of the postage printer as an auxiliary mechanism mounted on the high speed printer has the advantage of closer correlation of the two printing mechanism in time and in space. The closer correlation in time eases the problem of printing the address and postage impression at different times. Thus in the embodiment of FIG. 4 the printing stations are separated by a relatively small number of print lines. The correlation in space makes for a more compact and convenient installation, since a postage printer mounted directly on the high speed printer does not occupy any additional floor space, and does not introduce the problem of a vulnerable paper web passing across the intervening space between the two printing devices.

FIGS. 5 and 6 illustrate a high speed computer output printer 310 with the auxiliary postage printing mechanism 312 mounted in piggy-back fashion thereon. The computer output printer 310 may be any standard form of high speed printer of the kind which is normally driven by an electronic digital computer in conventional data processing installations. The particular high speed printer 310 illustrated in FIG. 5 is basically a standard IBM Model 1403 chain printer, which has been modified only to the extent necessary to mount the postage printer 312 thereon. The high speed printer 310 and the postage printer 312 receive their data inputs from the same digital computer (not shown), but they arrive over separate data input cables 328 and 322 respectively.

The chain printer 310 impresses printed data upon paper web 314 in response to computer-generated signals received over data cable 328. The paper is advanced through the printer line-by-line by means of conventional paper tractors (not shown) acting upon sprocket holes 426 along either edge of the paper web. For mailing label applications, the paper web 314 comprises a backing sheet 428 which has the sprocket holes 426 punched therein and is wide enough to engage the paper tractors on either side of the postage printer 312, plus a centrally located front strip 430 which is narrower and consists of a series of individual mailing labels 430.1, 430.2, etc.

Printing by the chain printer 310 takes place somewhat below the level of the postage printer 312, and after each segment of the mailing label strip 430 is completed the paper web 314 is pulled upwardly by the tractors. At a somewhat higher location within the printing station of the high speed printer 310, the postage printer 312 makes its printing impression upon the same mailing label strip 430, in response to a computer-generated data input which arrives over the data cable 322 and advises the postage printer of the computer-calculated amounts of postage required for each package. Because of their different print locations along the path of the paper web 314, there is a time difference between the related printing operations of printers 310 and 312, of which the computer must be programmed to take account. After both printing mechanisms 310 and 312 have finished printing their respective impressions thereon, the label strip 430 is separated from the backing sheet 428 and divided into individual mailing labels 430.1, 430.2, etc. which are then affixed to respective packages for mailing.

The convention frame structure of an IBM Model 1403 chain printer 310 includes a pair of upper and lower frame members 422 and 423 respectively which extend horizontally across the printing station, and are used as the basic support for the piggy-back postage printer 312. A pair of side bars 432 are each bolted at their upper ends to the upper frame member 422 and at their lower ends to the lower frame member 423 of the main printer 310. At their lower ends, these side brackets 432 are formed with rearwardly projecting bar-supporting lugs 434 which receive the opposite ends of a threaded bar 436, and forwardly projecting hinge lugs 438 which interengage with hinge lugs 440 formed on a pair of end brackets 422. Hinge pins 444 and 446 pass downwardly through vertical holes which are drilled through all the hinge lugs 438 and 440 to secure the end brackets 422 to the side brackets 432 at either side of the printing station (see also FIGS. 7 and 9). The postage printer 312 is supported on a pair of slide rails 448 which extend horizontally between the two end brackets 422, and permit the postage printer 312 to slide horizontally to a position of printing relationship with the label strip 430. Set screws 450 hold the printer 312 in place after initial adjustment.

As seen in FIGS. 6 and 9, a special platen assembly 452 for cooperating with the postage printer 312 is located directly behind the paper web 314, and is supported, with provision for lateral position adjustment, by threaded engagement with the bar 436 and clamping engagement with the lower frame member 423. The threaded engagement with the bar 436 is accomplished by a pair of upwardly and rearwardly extending tapped lugs 454. The clamping engagement with the lower frame member 423 is accomplished by front and rear plates 456 and 458 respectively which surround the lower frame member 423. Bolts 460 passing through the front plate 456 are threaded to the rear plate 458 to secure them in clamping relationship about the lower frame member 423. The actual platen surface is a hard rubber insert 462 which is received within an appropriate recess on the front surface of the front clamping plate 456.

An inked ribbon 464 passes entirely around the outside of the postage printer housing 318 and downwardly between the postage printer mechanism 312 and the paper print-out sheet 314, in order to provide ink for postage impressions. As seen in FIGS. 6, 9 and 10, the ribbon 464 is advanced continuously by a roller 466 journaled between plates 468 and 469 and driven by a ribbon advance motor 470 secured to the plate 468. Both plates 468 and 469 are mounted on the exterior of the housing 318. Idler rollers 472 are rotatably mounted upon links 474 by a shaft 476, and the links in turn are pivotally mounted upon a shaft 478 journaled between the mounting plates 468 and 469. Torsion springs 480 are wrapped around shaft 478 and react against pins 481 and shaft 476 for biasing the idler rollers 472 against the ink ribbon 464 to maintain driving engagement with the motor-driven roller 466.

With reference to FIGS. 7, 8 and 9, the postage printer 312 comprises a plurality of individual type segments 500 for printing the postage impression, including several which incorporate variable numerical information 501 to form the amount of postage. In the particular example illustrated, there are eight type segments 500, four of which (500.1 through 500.4) are of the variable numerical kind, allowing for a maximum postage amount of $99.99. The remainder of the type segments (500.5 through 500.8) are dedicated exclusively to non-variable information including an authorized government postage validation symbol 502 and an identification 506 of the city and country in which the mailer is located. The type segments 500 print through a window 508 formed on the undeside of the secure housing 318. The window 508 is just large enough to permit the type segments 500 to protrude therethrough for printing purposes, and does not admit the introduction of any tools which might be used to tamper with the mechanism inside the housing 318. The electrical signals for setting the variable numerical information on type segments 500.1 through 500.4, and for firing the print solenoids 338, arrive over the armored cable 322 entering one side of the secured housing 318.

For a more complete understanding of the modifications necessary to mount the postage printer 312 upon a conventional high speed, computer-driven chain printer, see copending U.S. Pat. application Ser. No. 195,729, entitled "Computer-Responsive Supplemental Printer," filed the same day as this application by Lupkas, Freeman and Check, and assigned to the assignee of this application.

FIGS. 8 and 9 illustrate the type of solenoid-actuated segmented printing mechanism which is preferred for rapid, computer-controlled printing of postage impressions in accordance with this invention. The paper web 314 comprising separable labels 314.1, 314,2 and the inked ribbon 464 are fed between the platen 462 and the printing segments 500. Each segment is first driven through a printing stroke by its respective solenoid 338, and subsequently is retracted by its respective return spring 522. For a more detailed description of the solenoidactuated printing mechanism, refer to the Lupkas, Freeman and Check application cited above.

This type of printing mechanism is much faster than those used in mechanical postage meters, and has a much longer life when operated at speeds which are compatible with a computerdriven chain printer. It is not as fast as the chain printer 310, but compatability in this application does not require equality of speeds. In printing address labels for high volume mailing, a typical application requires the chain printer 310 to print several lines of address information on each label. If the output of the chain printer in such an application is considered in labels (rather than lines) per second, since the postage printing mechanism 312 need only make one printing impression per label, it is compatible in terms of speed if it can run at about two or three postage impressions per second. In contrast to conventional motor-driven postage printers, the solenoid-driven mechanism 312 is capable of achieving such speeds even if the postage amount is changed for every print impression.

FIG. 8 illustrates the difference between the non-variable type segments 500.5 through 500.8 and the variable segments 500.1 through 500.4. Non-variable type segments 500.5 - 500.8 are solid slugs which contain only the type faces 523 for the fixed information in the postage impression. The other printing segments 500.1 - 500.4 are formed with hollow interiors 524 which open through windows 525. Surrounding the windows 525 are type faces for a continuation of the fixed information, but in addition type wheels 526 protrude through the windows 525 for printing purposes. These wheels contain respective sets of numerical type faces and are rotatable to select the number printed. The wheels 526 are part of respective number selection modules 528 received within the hollow interiors 524 of slugs 500.1 - 500.8. These modules include solenoid means (not shown) for number wheel rotation and electrical leads 530 for the input of number selection commands and the output of signals for verifying the angular positions of the number wheels. The variable information modules 528 are of a type available commercially from the Practical Automation Company of Shelton, Connecticut.

The output leads 530 provide a data feedback circuit which can be used to send information back to the computer verifying that the number wheels 526 have been rotated to the desired position, so that the computer can determine whether its postage selection instructions have been carried out before it prints the postage. This is one type of information which is carried back to the electronic metering circuitry 220 or 320 and to the computer 216 or 316 by the feedback lines 240, 242 or 340, 342 of FIGS. 3 or 4.

FIG. 11 shows the control and display panel 598 of the electronic meter 220 or 320. The meter includes a special type of self-scrambling combination lock switch which is used for recharging the postage credit balance under secure conditions. (See U.S. Pat. Nos. 3,664,231 and 3,034,329) The switch is manually operated by a knob 599 when the correct lock combination is entered on a keyboard 602. There is also an on-off switch 600, three indicator lights 604, 606 and 608 for power on, meter ready and insufficient postage respectively, a numerical display 610 which preferably has a ten digit capacity, and a set of display selector buttons 612, 614 and 616 which determine respectively whether the numerical display 610 shall show the amount in the ascending postage register, the descending postage register or the number of mailings recorded by a piece counter. Two additional buttons 618 and 620 are intended respectively to light up all the display elements for test purposes, or to turn the display off entirely.

Figure 12:
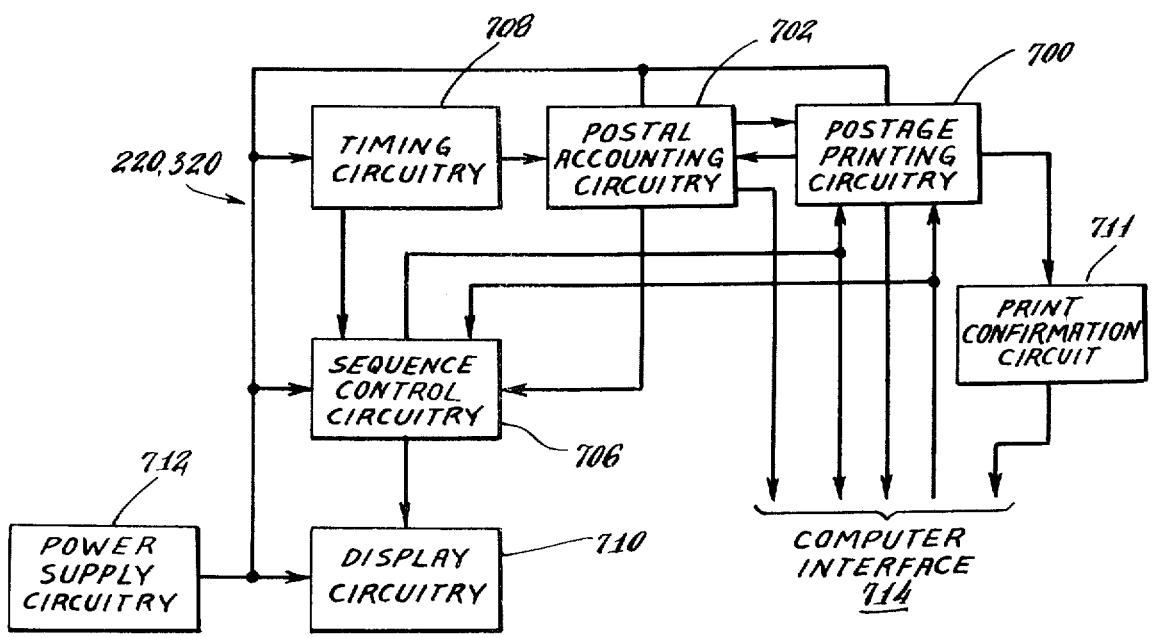
FIG. 12 is a simplified block diagram of the circuitry of the electronic meter.
Figure 13C:
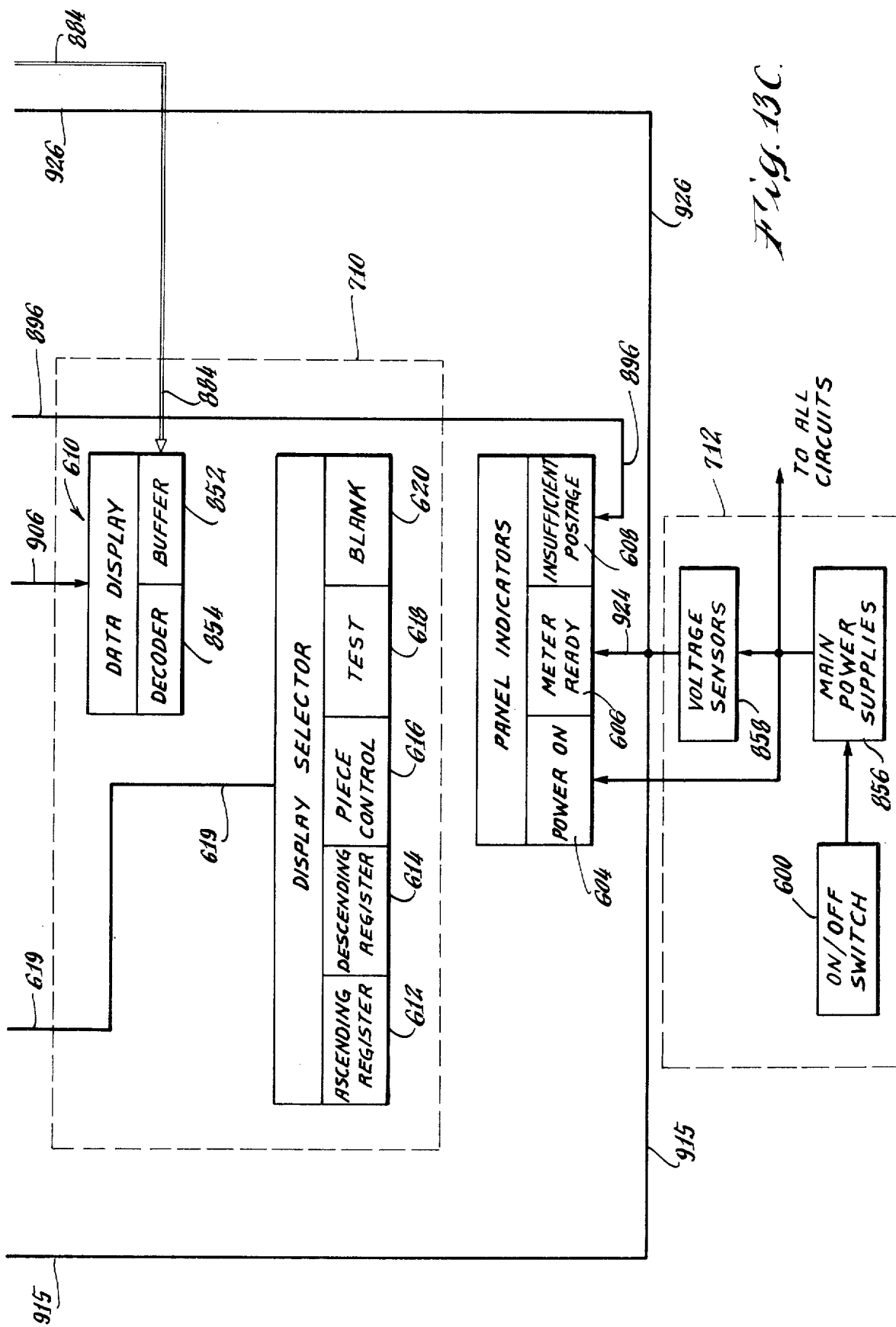

With reference to FIG. 12, in general terms the metering circuitry 220 or 320 of FIGS. 3 or 4 comprises postage printing circuitry 700 for driving print solenoids 238 or 338, and for providing the computer 216 or 316 with feedback information as to the condition of the variable number wheels 526 (FIG. 8). It also comprises accounting circuitry 702 which keeps track of the postal balance and alters that balance in response to the printing of postage. The electronic meter also comprises sequence control circuitry 706 which provides a hard-wired (i.e. fixed) program for stepping the electronic postage meter through a required series of operations. The sequence control circuitry 706 and the postal accounting circuitry 702 (non-volatile memory and arithmetric unit) both operate in response to timing circuitry 708 in order to achieve synchronous operation. Display circuitry 710 indicates the contents of the various postal accounting balances at a given time. A print confirmation circuit 711 advises the computer as to whether postage printing has been accomplished. All of the circuits in FIG. 8 are energized by power supply circuitry 712; and circuits 700, 702, 706 and 711 communicate with the computer through an appropriate interface 714.

As used hereinafter in this description, the following definitions shall apply:

Machine cycle — eight gray code counter states or one address duration.

Meter cycle — duration of generation of entire sequence of 32 addresses.

Mode — any of three control states which generates a meter cycle. They are (1) ENTER POSTAGE, (2) ADD FUNDS and (3) CYCLE.

ENTER POSTAGE — mode in which postage amount to be printed is added to the ascending register and subtracted from the descending register. The piece counter is incremented by one.

ADD FUNDS — mode in which a fixed postage amount is added to the descending register - other registers remain unchanged.

CYCLE — mode in which all registers remain unchanged — this mode is used principally in accessing memory contents for readout. It is also entered through the initialization procedure.

Insufficient Postage — an indicator which signals that the contents of the descending register are below the maximum amount the meter is capable of printing in one postage field.

Polling — process by which priority of the control states (modes) is implemented. A sequential check of modes is made until one is selected.

In normal operation the following sequence takes place:

One meter cycle in CYCLE mode takes place due to initialization. At least one free machine cycle follows before the next mode may be initiated. The mode may be any one of the three unless inhibited due to postage depletion or similar condition. Every meter cycle has at least one free machine cycle following it to allow polling.

Use of this free machine cycle is also utilized in asynchronously reading meter memory contents, one 4 bit word at a time. The minimum access rate is one word per meter cycle although in practice register contents would be read out in sequence without intervening meter cycles.

To fetch master memory contents, the computer feeds into the meter the address of the word it wants to read and a read command. At the end of the then current meter cycle, the meter will read the memory location and put the contents in the interface. To read the complete register, the computer has to generate the address sequence of the register, reading the contents one BCD digit at a time.

As seen in greater detail in FIG. 13, the computer interface circuitry 714 comprises conventional hardware 798 (16 bit output port with strobe) which is designed to translate the timing and/or data code format of the computer into any other timing and/or data code format that may be employed by the electronic postage meter 220 or 320 (i.e., match the transmission lines to and from the computer). It also includes a computer status register 800 which accepts commands and postage amount data from the computer for use by the meter, and a meter status register 802 which accepts status indications and stored data from the meter circuitry and generates interrupts for use by the computer. The printing circuitry 700 includes the print solenoids 238 or 338 which drive the fixed and variable type segments 500.1–500.8; and solenoid 801 for operating a mechanism which locks the segments except during postage printing; switches 803 which sense the condition of the locking mechanism and the print segments 500.1 –500.8 to provide information needed by the print confirmation circuit 711; a circuit 805 which fires the solenoids 801 and 238 or 338 in a predetermined sequence; the variable number wheel modules 528, one for each variable digit of the postage amount, which rotate the number printing wheels 526 to select the postage digits in response to computer-generated electrical commands; and a buffer 804 which stores the calculated postage amount both for use by the variable modules 528 in setting the number wheels 526 and also for use by the postal accounting circuitry 702 in altering the postage balances.

The postal accounting circuitry 702 comprises a memory 806 which includes an ascending postage register 808, a descending postage register 810, and a piece counter 812 which keeps track of the number of postage impressions made. In a preferred embodiment of the invention, the memory 806 is of the complementary metal oxide semiconductor (C/MOS) integrated circuit type, and requires a back-up battery 813 to preserve storage during A.C. power failures. The current drain of such memories is extremely small and storage would remain intact even if a power failure lasted for very long intervals. Memory addressing is done by a decoder circuit 814 whenever information is loaded into or fetched from the ascending or descending registers or the piece counter section of the memory 806. An arithmetic unit 816 is used to perform postal accounting calculations, i.e., substracting the amount of postage from the descending register 810 and adding it to the ascending register 808 when printing occurs, and adding postage to the descending register 810 when the meter is recharged. The arithmetic unit 816 includes buffers 818 into which the ascending and descending register contents (from memory 806) and the postage amount (from print buffer 804) are loaded prior to arithmetic operations.

There is also an insufficient postage decoder circuit 820 which tests the content of the descending register 810 and determines when the postal credit balance falls below a predetermined threshold. This could be done, for example, by comparing the proposed amount of postage in the print buffer 804 with the remaining postage balance in the descending register 810. In a preferred embodiment of the invention, however, the circuit is simplified by using the same insufficient postage criterion that has long been employed in mechanical postage meters: i.e. whenever the descending postage credit balance equals or falls below the maximum amount of postage that the meter is capable of printing, in this instance $99.99, the balance is insufficient.

For recharging the meter, there is the combination lock switch 860 which is operated by the knob 599 and keyboard 602 seen in FIG. 11. When the meter user pays a required sum, postal authorities give out the combination of the lock, permitting the meter user to operate the switch 860 once, which recharges the descending postage register 810 by a fixed increment equal to the sum paid. Thereafter the lock automatically rescrambles the combination so that another payment must be made to obtain the next combination from the postal authorities.

The sequence control circuitry 706 includes a clock 822 which comprises a time base oscillator 824 (Digital Equipment Corp., Model No. 401) producing a pulse stream for driving a Gray code counter 826. The Gray code approach is employed to take advantage of its single bit transition characteristic, which provides a clean output for driving following circuitry. The output of the Gray counter 826 is used to drive a memory addressing counter 828, the count cycle of which is numerically equal to the total number of addresses in the memory 806. In a particular embodiment of the invention, for example, the capacity of the memory 806 is 32 addresses, each of which stores a single binary-coded decimal digit. Sixteen of those addresses are required for the ascending register 808, eight for the descending register 810, and eight for the piece counter 812. The memory addressing counter 828 steps through a sequence of all 32 memory addresses when driven by the Gray code counter 826.

In order to make sure that each memory address count sequence of the circuit 828 is synchronized with the start of a Gray code count sequence of the circuit 826, an AND gate 830 ordinarily blocks the Gray count from reaching the memory addressing counter. However, when the Gray count reaches 0, a decoder circuit 832 sets a count starting flip-flop 834 which then enables the AND gate 830, permitting the Gray counter 826 to drive the memory addressing counter 828 via lead 831. At the end of a complete memory addressing sequence of circuit 828, the last memory address is decoded by a circuit 836 which then energizes a lead 837 to reset the count starting flip-flop 834.

The sequence control circuitry 706 also includes a polling circuit 838 which is driven by the Gray code counter 826 and continually tests for three commands in the following priority sequence: (1) postage printing, (2) addition of funds to recharge the descending postage balance, and (3) display read-out. When one of these three operating modes is selected by the polling circuit 838, it sends the relevant mode command over a lead 840 to control logic circuitry 842 which then carries out the indicated activities in a hard-wired program sequence. The sequence control circuitry 706 also includes an initialization circuit 844 which includes circuitry 846 and 848 wired for fixed-program start-up and shut-down routines respectively.

The display circuitry 710 includes the display selector panel switches 612–620 of FIG. 11, by means of which the user can request ascending or descending register or piece-counter information to be fetched from the memory 806 and displayed on the read-out 610, and can also test or blank the read-out 610. The latter circuit includes a buffer 852 to hold the display data fetched from the memory 806, and a decoder 854 for translating the data into a form suitable for use by the read-out 610.

The power supply circuitry 712 includes main power supplies 856. These provide operating voltages required by all the circuits in FIG. 12; and are controlled by the on/off switch 600. There is also a voltage sensing circuit 858 which determines when there is a power failure or low voltage condition which might produce an error in the computations carried out by the arithmetic unit 816. When an out-of-tolerance voltage condition occurs, appropriate signals are sent to the initialization circuit 844 and meter status register 802.

Panel indicator light 604 responds to the main power supplies 856 by indicating whether power is on. Panel light 606 responds to the voltage sensor circuit 858 by indicating whether the meter is ready for operation. Finally, panel light 608 responds to decoder 820 by indicating that an insufficient postage condition has occurred.

The operation of the circuit of FIG. 13 will now be described. When the computer 216 or 316 calculates a postage amount to be printed on a mailing label, it transmits that information to the interface hardware 798. The interface hardware then translates the postage data into the data code format employed by the electronic postage meter circuit 220 or 320, and sends it to a data storage portion 862 of the computer status register 800. From there the postage amount is transmitted to the postage buffer 804 over a cable 864.

The computer also stores a postage setting request in a command section 866 of the computer status register 800. That register in turn sends a printer signal to the control logic 842 over a lead 866. The control logic then issues an enter postage command over a lead 868 which causes the variable print modules 528 to be set to number positions representing the postage amount then contained in the print buffer 804. A data feedback line 870 carries back a signal from the variable modules 528 to convey print module status information to an interrupt and status indications section 872 of the meter status register 802, so that the computer will know when the print wheels 526 are properly set. If they are not properly set, that fact is reported back to the computer by the meter status register 802 and interface hardware 798. As a result, the computer does not issue a print command until the problem is resolved. But if the computer receives an indication that the variable print modules 528 are set to the proper numerical values, then it issues a print command which is transmitted through the interface hardware 798 and the command section 807 of the computer status register 800, and then over lead 874 to the first priority section of the polling circuit 838.

The polling circuit enters the first priority printing mode, and sends a print mode command over the lead 840 to the control logic 842, which then issues print instructions over a lead 876. If a NAND gate 878 is not disabled, the print command passes through the gate and traverses leads 879 and 881 to the solenoid sequencing circuit 805. The latter then fires the solenoid 801 to unlock the print segments 500, and also fires the print solenoids 238 or 338 in sequential relationship (for a disclosure of the sequencing circuit 805, refer to the Lupkas, et al application cited above). The signal on lead 879 is also conveyed over lead 880 to the arithmetic unit 816 and causes it to perform a subtraction operation deducting the amount of postage from the descending register balance.

In order to perform this operation, the arithmetic unit buffers 818 receive the postage amount information over a cable 882 from the print buffer, and they also receive the contents of the descending register 810 over a memory fetch cable 884. The necessary memory addressing operation to access the descending register is carried out by the memory address decoder 814 in response to address information received over a cable 886 via a data gate 905 and counter 828. The control logic circuit enables the gate 905 and arithmetic unit 816 by means of leads 904 and 894, respectively.

The arithmetic unit 816 carries out its calculation and reloads the decremented postage balance back into the descending register section 810 of the memory 806 over a cable 895. Once again, the memory address decoder 814 performs the addressing function during loading, responding to the address information on the cable 886, while control signals arrive over leads 904 and 894 from control logic 842.

In similar fashion, the amount of postage is added to the ascending register 808. The piece counter 812 is incremented each time the "enter postage" mode is initiated.

Summarizing the printing operation, the computer command for setting the variable number wheels goes directly over lead 866 to the control logic 842, so that the setting function is carried out off-line with respect to the polling circuit 838. Then there is a feedback output over lead 870 to the computer to verify correct number wheel setting. Subsequently a print command goes over lead 874 to the polling circuit 838. When there is no higher priority operating mode requested, the print mode is entered and the control logic 842 issues a command which simultaneously fires the print solenoids 238 or 338, initiates the postage subtraction operation of arithmetic unit 816, increments the piece counter 812 and adds the postage amount to the ascending register.

These operations cannot be carried out, however, unless the insufficient postage decoder 820 detects an adequate postage balance remaining in the descending register 810, and therefore enables the NAND gate 878. If the postal credit balance is insufficient, the output from the decoder 820 inhibits the NAND gate 878. As a result, the print solenoids are not fired, the postage balance is not decremented, the ascending register is not incremented and the piece counter is not incremented. In addition, the decoder output goes over a lead 896 to turn on the insufficient postage panel indicator light, and goes over a lead 898 to convey an insufficient postage indication back to the interrupt and status indication section 872 of the meter status register 802. The computer programmer can then use this indication to initiate any desired program routine.

In a preferred embodiment of the postage printer, the print segments 500.1–500.8 are normally locked, for additional postage security, by the locking mechanism controlled by solenoid 801. The latter is unlocked only at the time that postage printing is initiated, and then locked again after printing. The switches 803 serve to sense the locked and unlocked condition of the lock mechanism, and also sense when print segments 500.1–500.8 respectively advance to print impact position upon energization of the print solenoids 238 or 338. For a complete disclosure of the locking mechanism, the solenoid 801 and the switches 803, refer to the Lupkas, et al application cited hereinbefore.

When the print mechanism is unlocked by solenoid 801, switches 803 issue a signal on a lead 940 to set a lock mechanism flip-flop 942. The set output of that flip-flop then resets each one of a group of print segment flip-flops 944.1–944.8, associated with the print segments 500.1–500.8 respectively. Then the print segment flip-flops 944 wait to detect the movement of the print segments 500 to their print impact positions. As each print segment 500 advances to print impact position, a respective lead 946.1–946.8 is energized by the associated print confirmation switch 803 to set the associated print segment flipflop 944. All the set outputs of these flip-flops 944 lead to an eight-input NAND gate 948. The output of the NAND gate passes through a delay circuit 950 and is controlled by a coincidence gate 952. After printing the solenoid 801 is de-energized, and thus the loocking mechanism is re-locked, causing one of the sensing switches 803 to issue another signal on a lead 952 which resets the flip-flop 942. The reset output of that flip-flop then enables coincidence gate 952.

Upon the enabling of gate 952, the print confirmation circuit 711 can determine whether all the print segments 500.1–500.2 were successfully driven to print impact position during the preceding print operation. If all the print segments 500 have been driven to print impact position, the print confirmation switches 803 will have set all the flip-flops 944, and there will be no output from the NAND gate 948. Accordingly there will be no output from the print confirmation circuit 711 on its print segment status output lead 954. On the other hand, if any one or more of the print segments 500 fail to advance to print impact position, the corresponding flip-flops 944 will not be set. Consequently there will be an output from the NAND gate 948. This output, delayed by circuit 950, will pass through coincidence gate 952 when the latter is enabled at the end of the print operation, resulting in an output on lead 954 by which the print confirmation circuit 711 advises the interrupt and status indication section 872 of the meter status register 802 that postage printing has not been successfully carried out as ordered by the computer. The computer can then carry out any appropriate alarm subroutine dictated by the programmer.

The next higher priority operating mode of the polling circuit 838 is the addition of funds to recharge the descending register 810 when an insufficient postage condition occurs. In order to avoid the need for carrying the postage printing mechanism and the accounting circuitry to a Post Office for recharging this invention contemplates the use of the selfscrambling combination lock switch 860. Such locks were previously developed for remote recharging of conventional postage meters. A mechanical combination lock of this type, which employs mutilated gears for scrambling, is disclosed in U.S. Pat. No. 3,034,329 of R. C. Pitney, and is suitable for use in the switch 860 of this circuit. As a preferable alternative, however, one might employ a keyboard-operated self-scrambling combination lock device as described in U.S. Pat. No. 3,664,231 issued May 23, 1972 by Walter J. Hanson, and assigned to the same assignee as the present application. Briefly, the Hanson device matches a hole pattern punches in a movable tape with a keyboardentered combination. If the combination is correct, the lock is released once, permitting the switch 860 to operate one time. Thereafter the tape is advanced to a new position, and consequently the switch cannot be operated without obtaining the next lock combination from postal officials.

The result of each lock opening operation is to close the combination switch 860, sending a signal over a lead 900 to the second priority section of the polling circuit 838. This causes an add funds mode signal to be transmitted to the control logic 842 over the lead 840. An add funds signal is then transmitted from the control logic 842 over a lead 902 to the arithmetic unit 816. The effect of that signal is to cause a predetermined increment of postage, equal in amount to the payment made to the postal authorities in order to obtain the lock combination, to be added to the descending register balance. The descending register portion 810 of the memory 806 is accessed and then reloaded with the new postage balance by the memory address decoder 814 in response to an addressing control signal arriving over a lead 904 from the control logic 842. The addressing control signal enables gate 905 during the memory addressing count sequence of circuit 828.

The third priority operating mode of the polling circuit 838 is the reading out of information into the panel display 610. This operating mode is entered in response to one of the manually operated panel switches 612–618, which determine whether the display is to show the contents of the ascending register, descending register or piece counter sections of the memory 806, or to light up a test display which energizes all read-out elements. Any of these switches generates a signal (represented by arrow 619) which causes the polling circuit 838 to enter mode No. 1. The switch 620 cancels the read-out operating mode entirely.

In response to a read-out mode signal on the lead 840 coming from the polling circuit 838, the control logic 842 sends a signal over address control lead 904 which enables gate 905 during the memory addressing count sequence. Memory contents are sequentially read out on cable 884. The signal on lead 906 from the control logic 842 strobes the selected information into the read-out 610.

The preferred form of display for this circuit is a lightemitting diode array with built-in integrated circuit decoding logic 854.

The computer can also access the memory contents at will, and fetch data therefrom to use for any purpose that the programmer desires. In order to accomplish this, the computer inserts the desired memory address into the data section 862, and also sends a memory reading instruction to command section 807 of the computer status register 800, which in turn sends a read memory signal over a lead 912 directly to the control logic 842, bypassing the polling circuit 838. The control logic 842 in turn sends a signal over the lead 892 to enable the data gate 888, admitting the computer-generated memory address arriving over cable 889 to the memory address decoder 814. This results in fetching the requested ascending register, descending register, or piece counter data from the memory 806 over cable 884, and inserting it into a data portion 914 of the meter status register 802. Then a computer can obtain the desired information from the meter status register.

There is a possibility of arithmetic error if postage computations are performed when the logic voltage levels supplied by the main power supply circuits 856 are not within tolerance. In order to make sure that all arithmetic computations take place under proper voltage conditions, and thus avoid postal accounting errors, the start-up program section 746 of the initialization circuit 844 does not turn on until it gets a signal over a lead 915 from the voltage sensor circuit 858 indicating that all logic levels are within tolerance. The initialization circuit 844 produces a start signal on a lead 916 which turns on the memory address decoder 814 and also makes sure that the gate controlling flip-flop 834 is initially reset.

In the event of a power failure, low voltage condition or shut-down of the meter, the voltage sensor 858 indicates a power-off situation to the shut-down program section 848 of the initialization circuit 844. At that time, the initialization circuit sends a stop signal on a lead 918 to a NAND gate 920. The NAND gate inhibits the stop signal if the polling circuit 838 signals over a lead 922 that an arithmetic calculation is currently in progress; i.e. the meter is in mode No. 1 or 2. Under those circumstances, calculation is allowed to proceed to completion. The power supplies 856 are designed with enough capacitance to allow operation at proper voltage levels for sufficient time to complete any arithmetic operation that may be in progress, even after total power failure. But after the present calculation is concluded, the polling circuit 838 and lead 922 cause NAND gate 920 to pass the stop signal out over line 921 in order to turn off the memory address decoder 814 and thereby preserve the memory contents unchanged for the duration of the power failure or other abnormal condition.

An additional lead 924 coming from the voltage sensor 858 lights up the meter-ready panel indicator light 606 when the logic voltages come up to required levels, and another lead 926 conveys the same meter-ready indication to the interrupt and status indication section 872 of the meter status register 802, thus advising the computer that the electronic postage meter is in condition for operation. When the voltage sensor circuit 858 senses a low voltage condition, the meter-ready-panel light 606 goes out and the meter-ready status indication in register 802 turns off, advising both the human operator and the computer of the problem.

Figure 14:
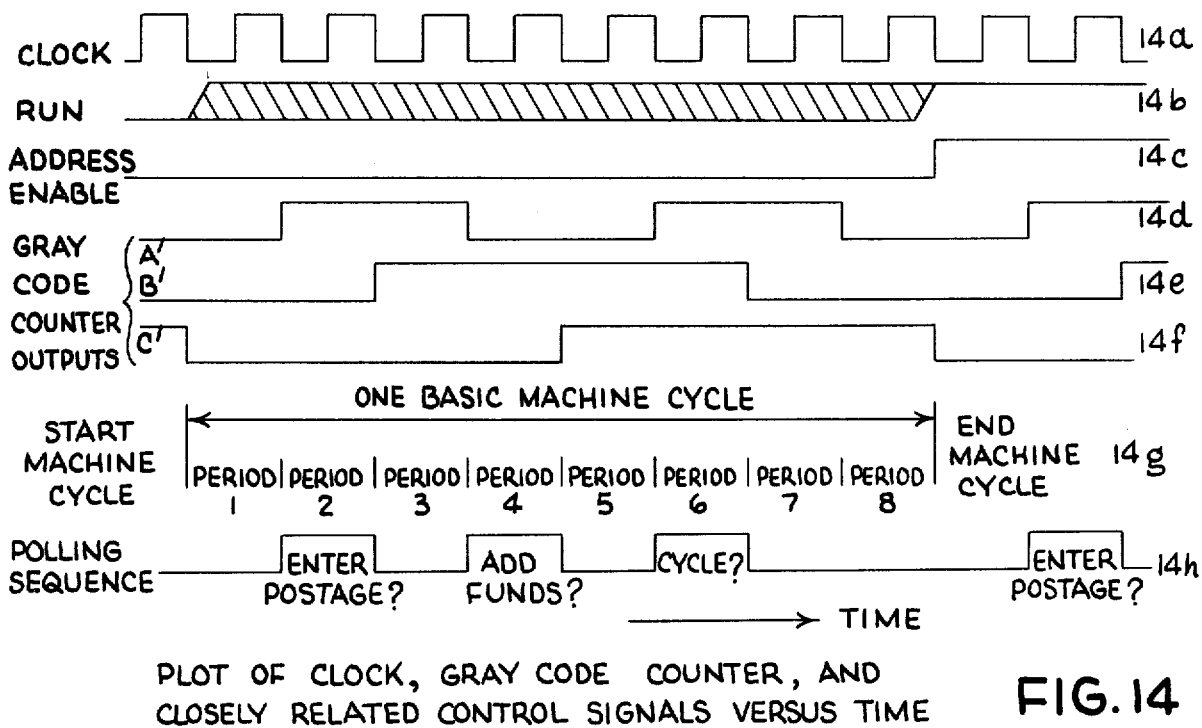
Figure 15:
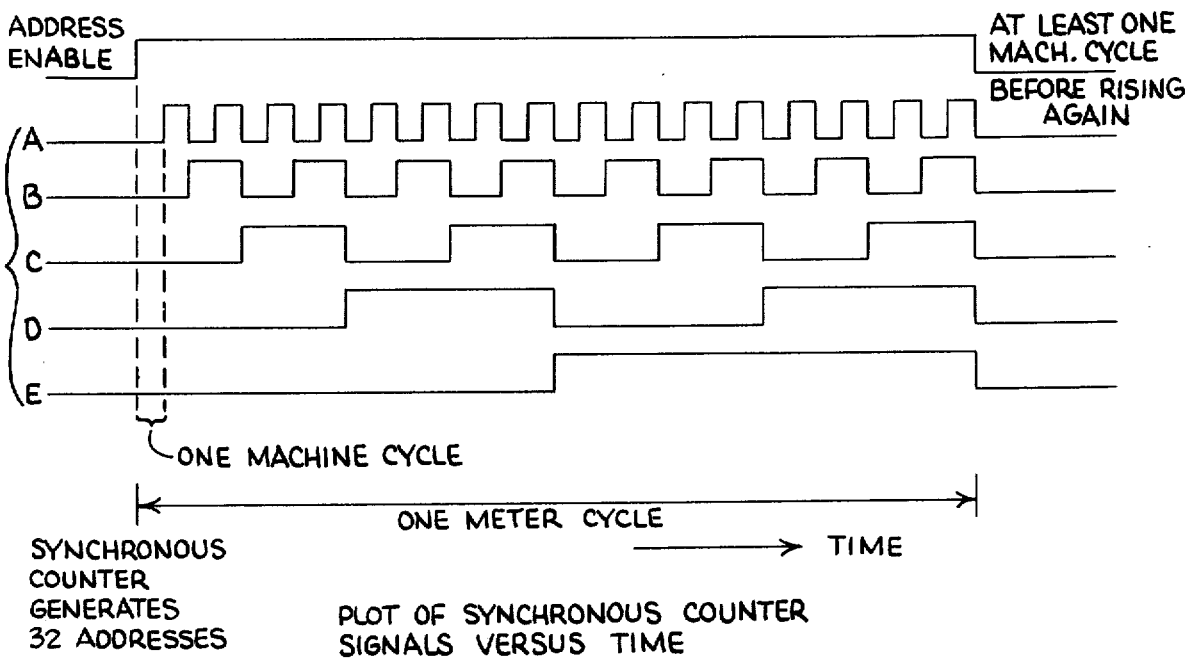

The operation of this postage system will be further described with reference to FIGS. 14 through 34. FIG. 14 shows the sequence of operation of the system including a plot of the clock 824, the gray code counter 826, and the polling signals with respect to time. The clock 824 as used in this inventive system is a standard module (Model M401-0-1, Digital Equipment Corporation, Maynard, Mass.) set to operate at a 4 MHz rate as shown in FIG. 14a. The electrical logic elements illustrated in the drawings are 7400 series TTL (transistor-transistor logic) components, such as are available from Texas Instruments, Inc., unless otherwise indicated herein. The internal control of the metering system is governed by the clock frequency, which is divided into eight timing periods (FIG. 14g) for each machine cycle, by the 3-bit binary Gray Code Counter 826 of FIG. 17. This free-running gray code counter 826 comprises 3 "J-K" flip-flops 1000, 1001 and 1002, respectively, providing outputs $A'$, $\overline{A'}$; $B'$, $\overline{B'}$; and $C'$, $\overline{C'}$ through buffers 1004, 1005; 1006, 1007; and 1008, 1009 respectively. The gray code counter outputs $A'$, $B'$, and $C'$, respectively (FIG. 14d, 14e and 14f, respectively) are repetitive every eight periods so as to establish a machine cycle (FIG. 14g). The flip-flops 1000, 1001 and 1002, change state one at a time. This has the advantage that the output is certain, and there is no timing (race condition) problem between the outputs. In other words, questionable outputs cannot occur because one output may be generated slightly out of phase with another output. These "clean pulses" are used for controlling the system, for gating purposes and polling.

Figure 17:
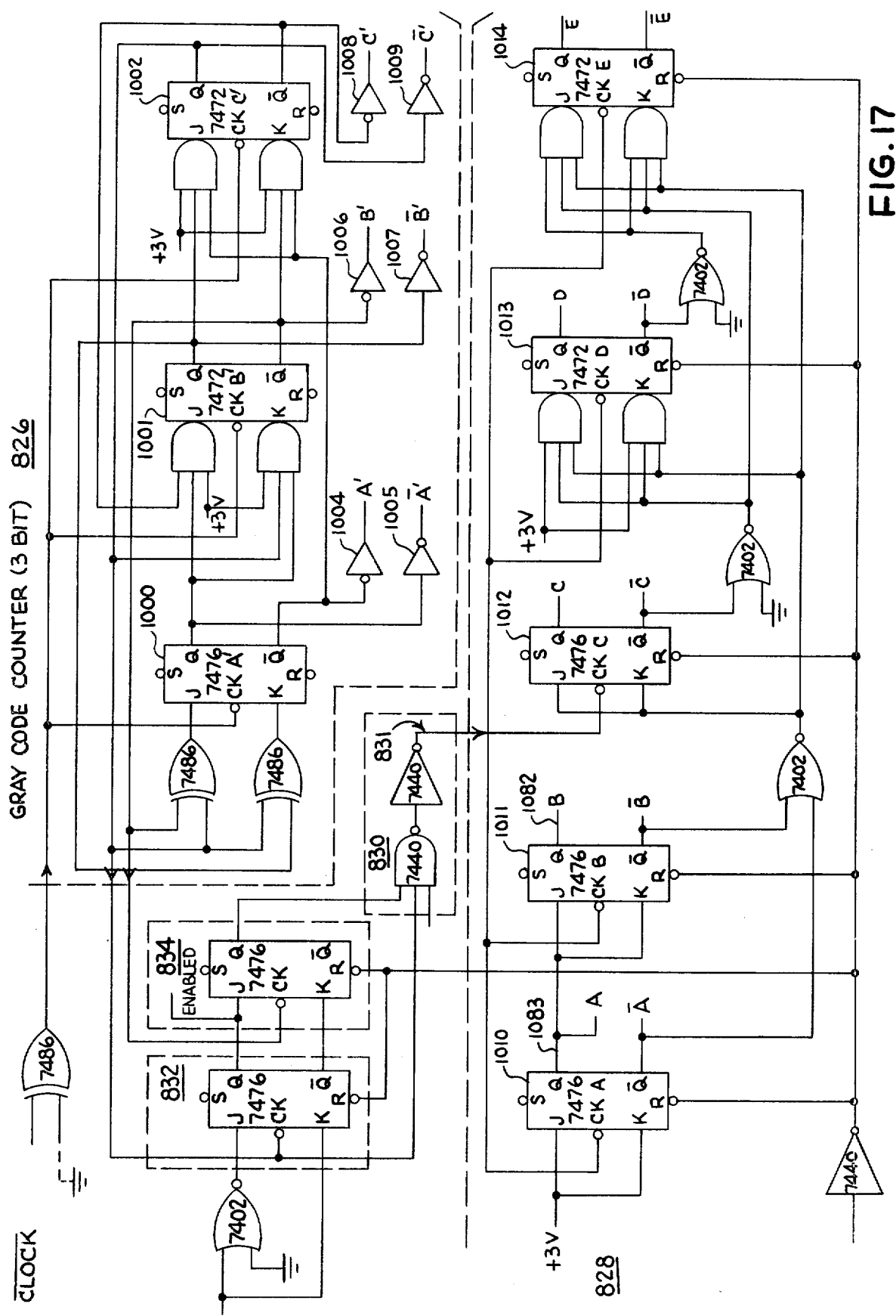

The gray code counter is used to drive a memory addressing counter 828 as shown in FIG. 17. The memory addressing counter is a 5-bit synchronous counter comprising 5 "J-K" flip-flops 1010, 1011, 1012, 1013 and 1014 wired as shown, and providing outputs $A$, $\overline{A}$; $B$, $\overline{B}$; $C$, $\overline{C}$; $D$, $\overline{D}$; and $E$, $\overline{E}$; respectively, Outputs A, B, C, D, and E are plotted in FIG. 15 with respect to time. The outputs A, B, C, D, and E are used to form 32 addresses as shown in FIG. 16. The synchronous counter counts in a straight binary sequence generating these addresses, but these addresses could also be supplied directly by the computer controlling the meter.

The memory addressing lines are enabled through period 2 through 7. The memory addressing counter changes between periods 8 through 1, so that the addressing lines are enabled only when no addressing changes are taking place. As indicated on FIG. 15, there must be at least one machine cycle before the address enable signal becomes high again. This allows a polling sequence to take place which then provides the highest priority mode awaiting service to be entered.

The meter cycle is generated by any of three controls (1) Enter postage, (2) Add funds, and (3) Cycle. These modes are sequentially checked by the polling circuitry 838 shown in FIG. 18. The polling circuit 838 is dependent upon the clock pulses for determining the polling sequence. The "enter postage" mode circuitry has the highest priority and is fed clock pulse 2 over line 1040; the "Enter funds" mode is fed pulse 4 over line 1041; and the "cycle" mode has the lowest priority, because this mode is generally only for the purposes of readout (accessing the contents of the memory for display purposes). The cycle mode circuitry is fed clock pulse 6 over line 1042. (See FIG. 14h).

The three flip-flops 1015, 1016 and 1017, respectively provide a signal to the control logic 842 over lines 1018, 1019 and 1020, respectively. These lines, for the sake of convenience, are represented by line 840 in FIG. 13. Flip-flops 1015, 1016 and 1017 are mutually exclusive. When one of these flip-flops goes "high" it disables the other two flip-flops by feeding a complementary signal back through the AND-gates 1021, 1022 or 1023 respectively, as the case may be. The AND-gates 1201, 1022 and 1023 feed their respective flip-flops 1015, 1016 and 1017. These AND-gates receive the signal from NOR-gate 1025, which feeds line 1024. The NOR-gate 1025 is tapped into lines 1018, 1019 and 1020, at points 1026, 1027 and 1028, respective, as shown.

Flip-flops 1034, 1035, 1036, respectively, store externally added information, such as enter postage, operate display, enter funds, over lines 619, 874 and 900, respectively. This externally applied stored information influences the operation of flip-flops 1015, 1016 and 1017, respectively, and may be present while any of the flip-flops 1015, 1016 or 1017 are inoperative or in a mode feeding capacity.

FIGS. 14b and 14c show the relationship of the address enable signal (FIG. 14c) to that of the polling run signal FIG. 14b). When the polling run signal goes high, (shaded portion shown in FIG. 14b) the zero count decoder 832 (FIG. 17) causes the address enable signal to go high at end of period 8.

As can be seen from FIG. 14h, the three polling modes are activated during periods 2, 4 and 6 respectively. The cycle mode is entered through initialization (when the system is turned on), and upon activating display select switches.

Figure 19:
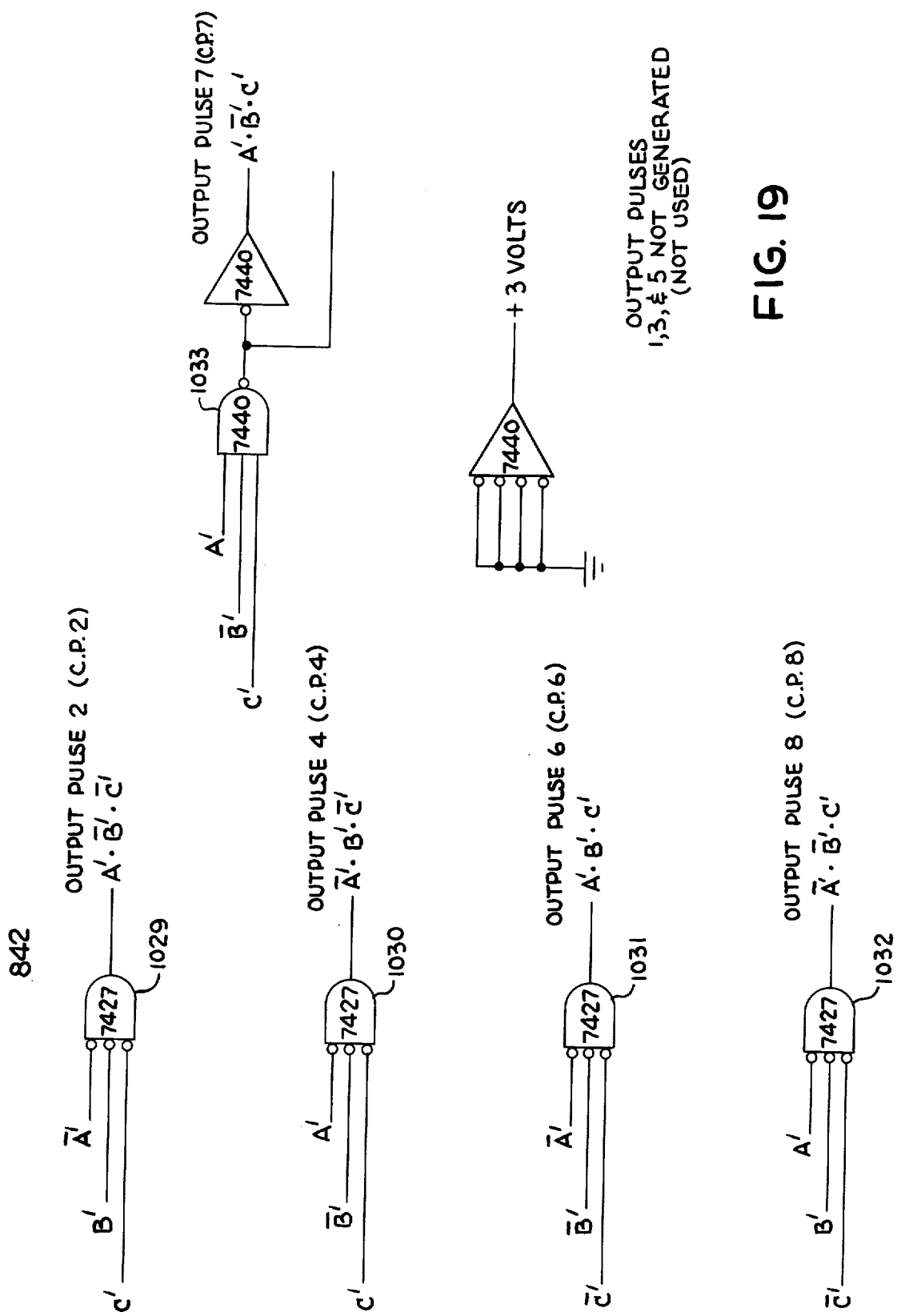

FIG. 19 depicts control logic gates 1029, 1030, 1031, 1032, and 1033 of the control logic circuit 842 (FIG. 13). These gates generate an output at given periods, depending upon the states of the gray code flip-flops 1000, 1001 and 1002, i.e., A' or $\overline{A'}$; B' or $\overline{B'}$; and C' or $\overline{C'}$ (see FIGS. 14d, 14e or 14f).

Logic gate 1029 generates output pulse 2; logic gate 1030 generates output pulse 4; logic gate 1031 generates output pulse 6; logic gate 1032 generates output pulse 8; and logic gate 1033 generates output pulse 7. Output pulses for periods 1, 3 and 5 are not generated because they are not used.

Figure 18:
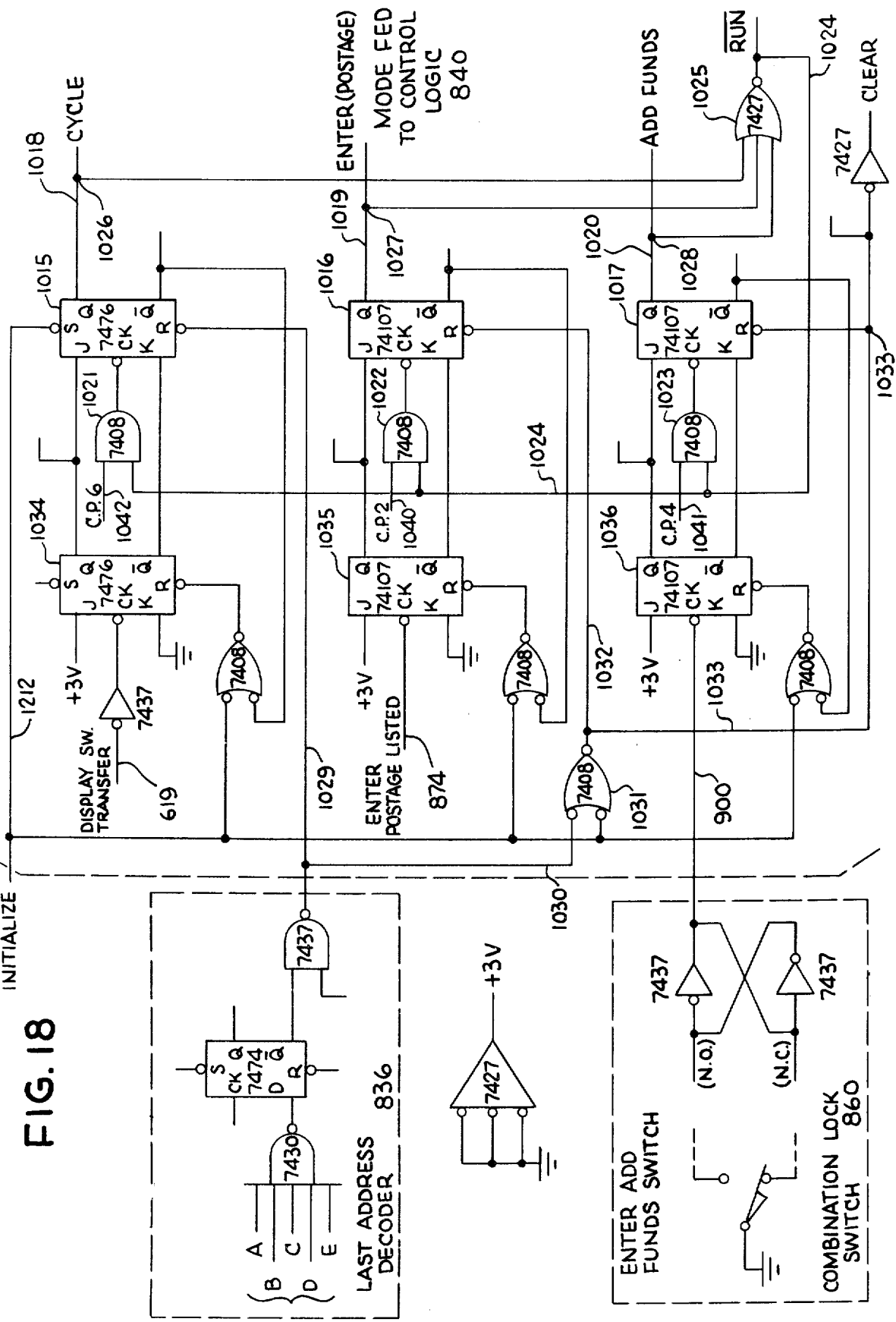

The last address decoder circuit 836 is shown in FIG. 18. This circuit is fed from the memory addressing counter 828 (FIG. 17). When the last address pulse is received by this circuit, it clears flip-flop 1015 over line 1029. Flip-flops 1016 and 1017 are cleared over line 1030 from circuit 836, which feeds gate 1031. Gate 1031 clears flip-flop 1016 and 1017 over lines 1032 and 1033, respectively.

The combination lock switch circuit 860 is shown in FIG. 18, and the add funds circuit over line 900. The combination lock switch circuit 860 is a well-known debounding circuit.

Figure 20:
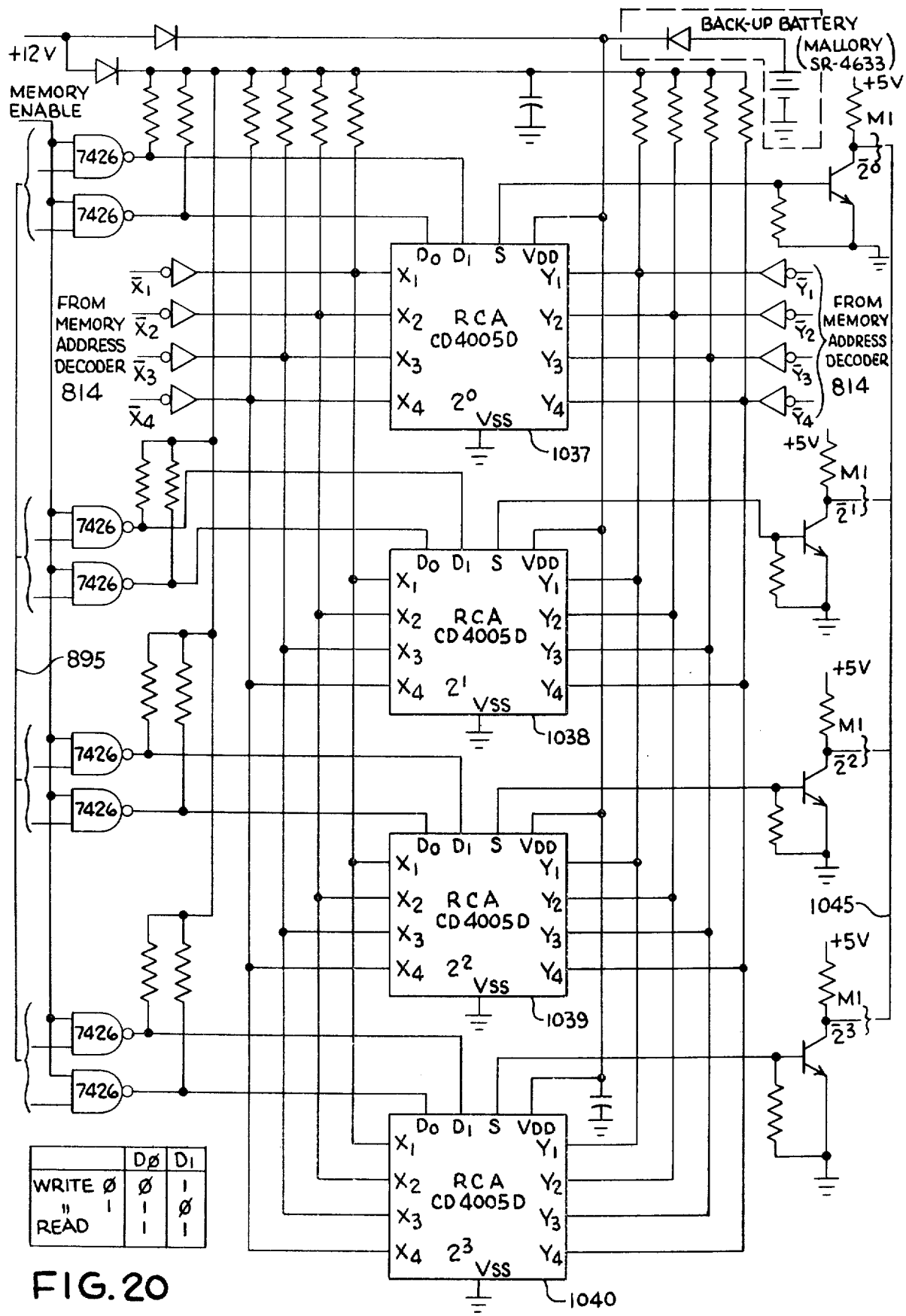

FIG. 20 depicts the memory circuit 806 of FIG. 13b. The memory consists of RCA's 16 bit COS/MOS memory chips arranged to provide 32 words 4 bits wide. The 32 memory locations are divided up into three registers: ascending register 808; descending register 810; and a piece counter 812. Each location (4 bit word) holds a binary coded decimal (see FIG. 16). The memory comprises two identical cards, each having 4 chips 1037, 1038, 1039 and 1040, respectively. In selecting an address, 1 bit is accessed in each of the four chips 1037, 1038, 1039 and 1040. This allows you to store a 4 bit binary coded decimal digit.

COS/MOS was chosen for its low quiescent power, which allows for battery operation over extended periods of time. This is important because continuous power is necessary to retain the memory contents.

Other features of this memory circuit include high noise immunity and simplified interfacing, as well as the aforementioned non-critical power requirements.

FIG. 16 shows that the first (0–15) 16 locations are assigned to the ascending register 808; the next (16–23) 8 locations are reserved for the descending register 810; and the last (24–31) 8 locations belong to the piece counter 812.

Figure 21:
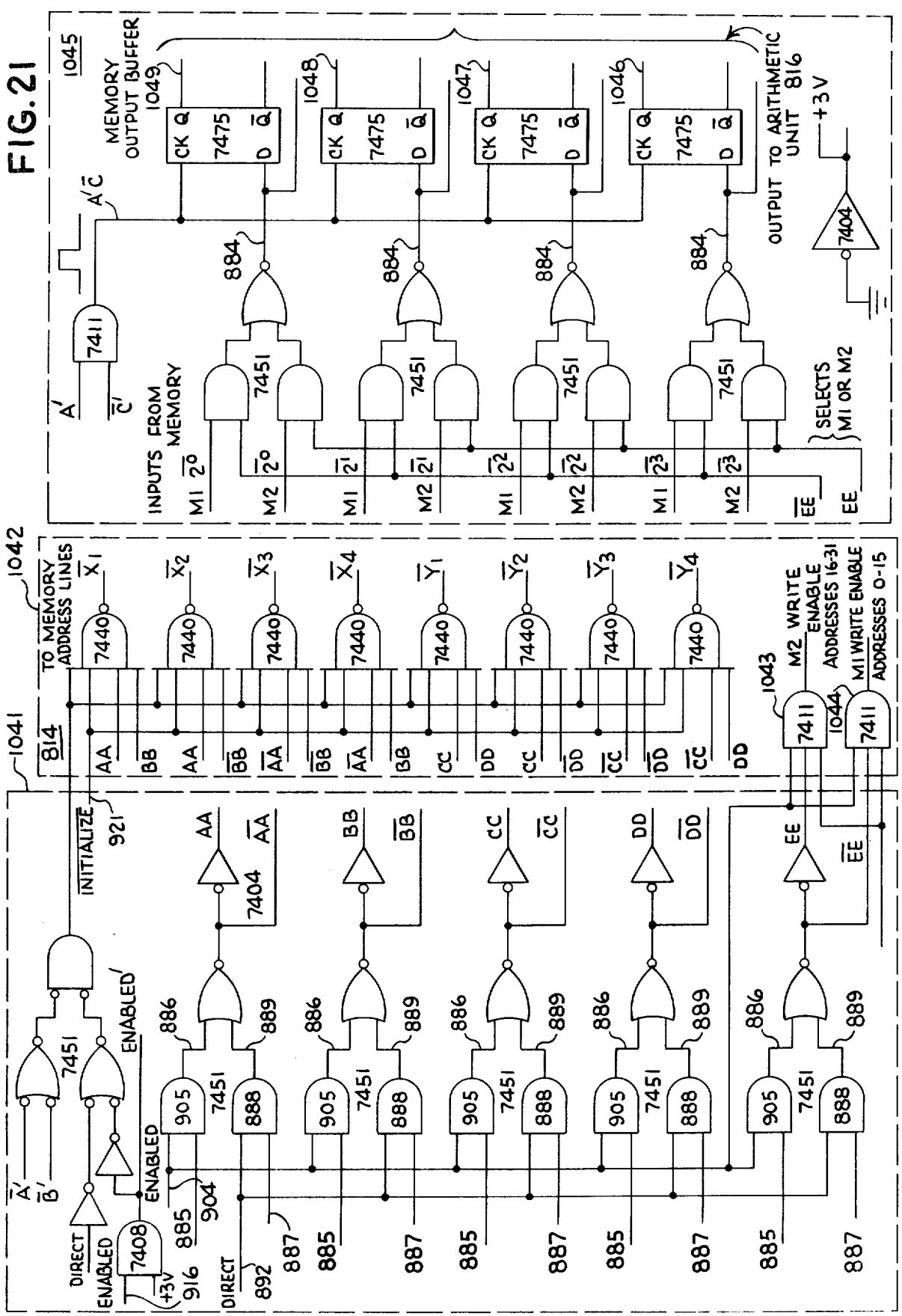

FIG. 21 illustrates the circuitry for the memory address decoder 814 and memory buffer circuitry for the memory 806. The AND-gates 888 and 905 in FIG. 21 are represented as a single AND-gate in FIG. 13b for schematic purposes. The lines 885 and 887, respectively feeding these AND-gates as shown in FIG. 13b, are shown in FIG. 21 as respectively linked to the multiple gates 888 and 905.

The outputs of the gating network 1041 containing AND-gates 888 and 905 are given as AA, $\overline{AA}$; BB, $\overline{BB}$; CC, $\overline{CC}$; DD, $\overline{DD}$; and EE, $\overline{EE}$; as shown. These outputs are fed to network 1042. The outputs of network 1042 connect to the memory chips 1037, 1038, 1039 and 1040 shown in FIG. 20. The outputs of network 1042 ($\overline{X_1}$; $\overline{X_2}$; $\overline{X_3}$; $\overline{X_4}$; $\overline{Y_1}$; $\overline{Y_2}$; $\overline{Y_3}$; and $\overline{Y_4}$) connect to the corresponding chip location.

The output gates 1043 and 1044 of network 1042, which provide outputs EE and $\overline{EE}$, choose either the first deck of chips, or the second deck of chips in memory. In other words, these outputs correspond to the column bit "E" in FIG. 16.

Network 1045 refers to buffer circuitry which is associated with the memory 806. The outputs of the memory as shown in FIG. 20 ($M_1\overline{2}^0$; $M_1\overline{2}^1$; $M_1\overline{2}^2$; and $M_1\overline{2}^3$) are fed to circuit 1045. The second deck of chips (not shown) in the memory provide outputs ($M_2\overline{2}^0$; $M_2\overline{2}^1$; $M_2\overline{2}^2$; and $M_2\overline{2}^3$) which supply circuit 1045 as shown. The designations $\overline{2}^0$ and $\overline{2}^3$ refer to the least and most significant bits, respectively. The outputs of network 1045 are supplied to the arithmetic unit 816.

Figure 22:
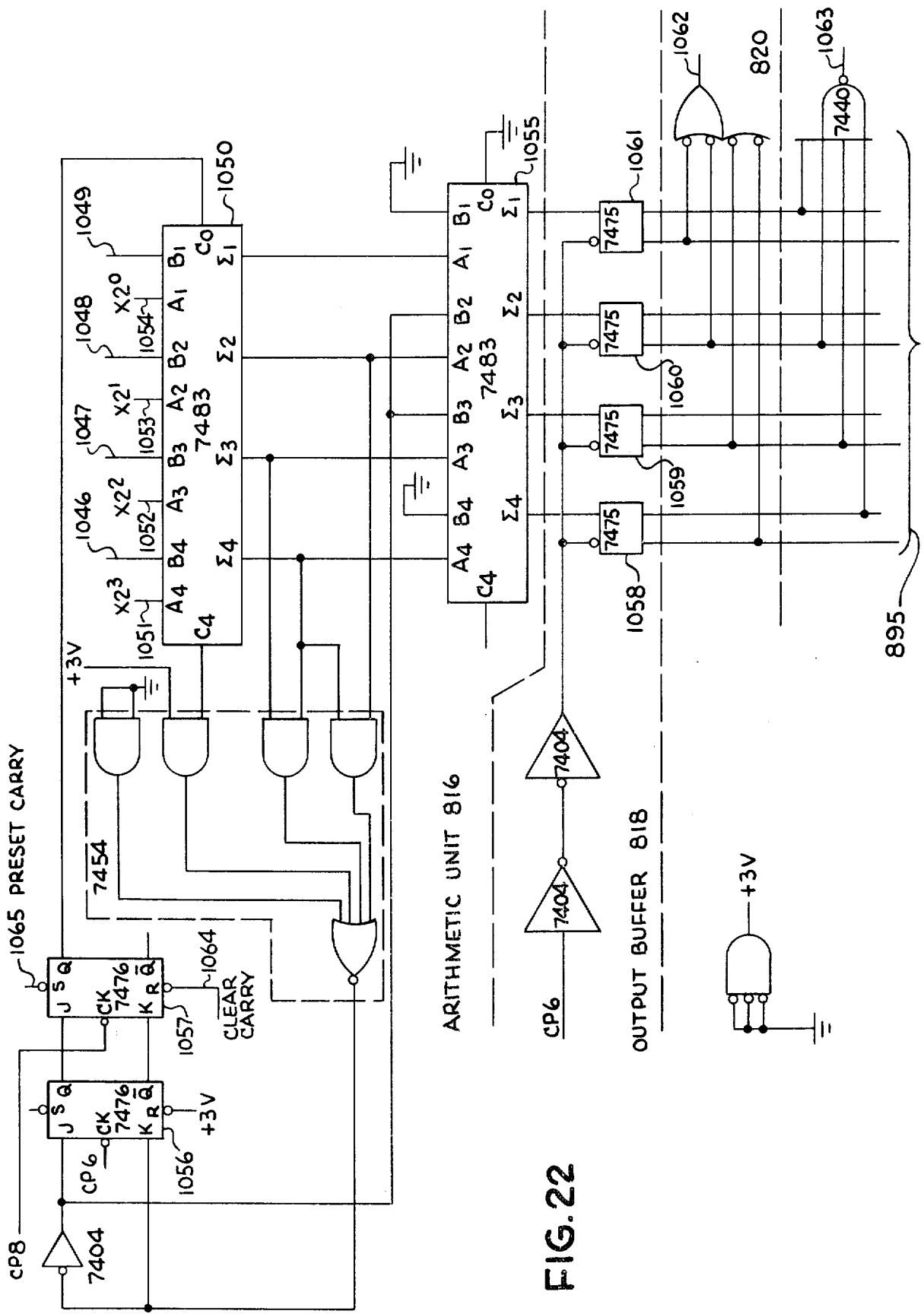

FIG. 22 shows the circuitry for the arithmetic unit 816, the buffer circuitry 818 feeding back to the memory 806 from the arithmetic unit, part of the insufficient funds circuit 820, and the add postage lock-out circuit (status indicator circuit 872).

Figure 24:
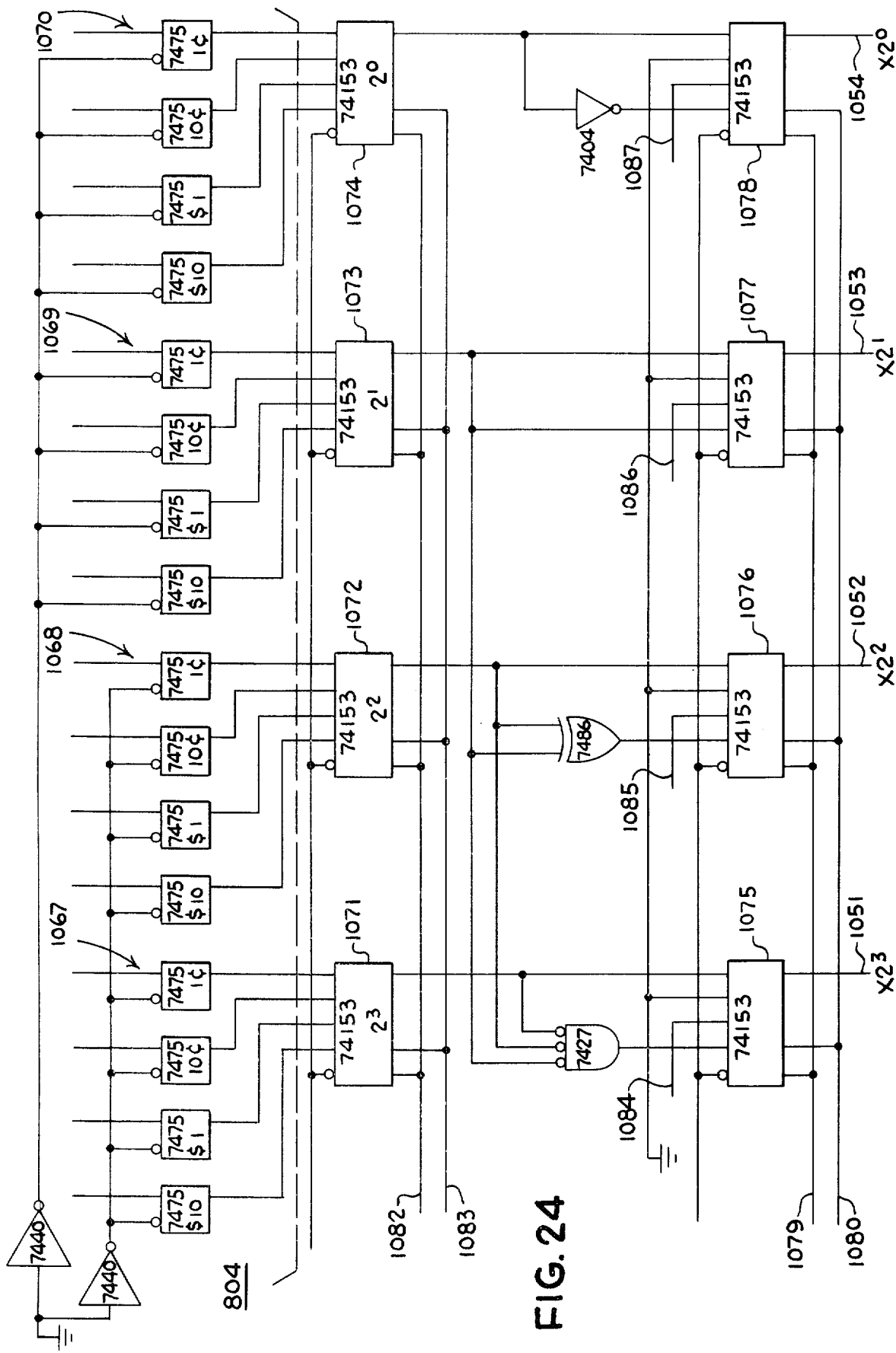

Circuit 816 of FIG. 22 is fed by the outputs of circuit 1045 of FIG. 21 through lines 1046, 1047, 1048 and 1049, respectively. The memory outputs fed over these lines is added to the applied signals to enter additional postage, which is fed over lines 1051, 1052, 1053 and 1054, respectively, from the postage buffer circuit 804 (FIG. 24). The postage buffer and memory outputs are fed to the binary adder 1050, where corresponding inputs (A and B) are summed. The outputs of the adder 1050 are fed to a decoder 1055 which converts the binary sums from binary to BCD.

Flip-flop 1056 and 1057 receive clocking pulses CP6 and CP8, respectively to control the proper propogation of the carry bit.

Figure 23:
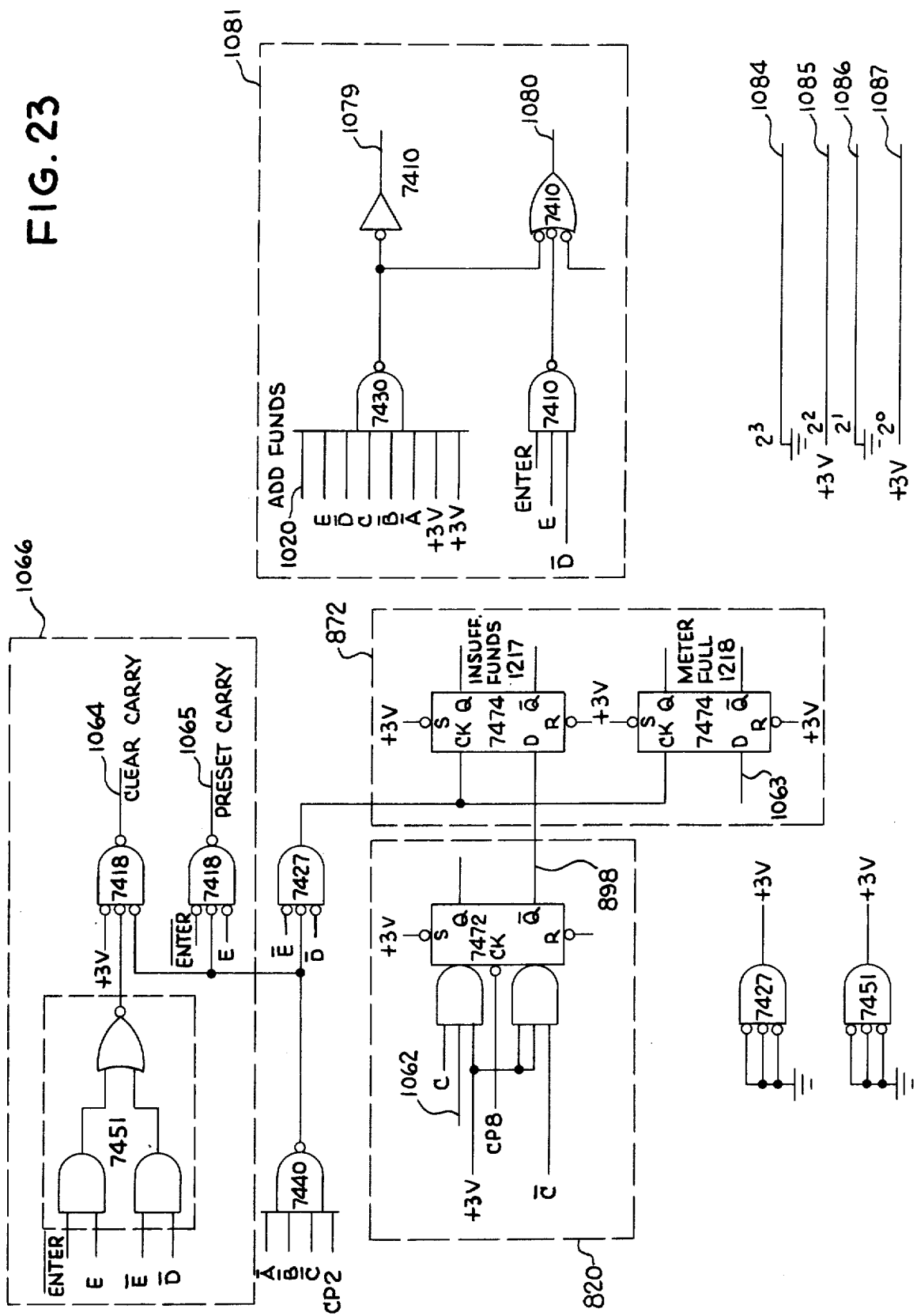

Ouput buffer circuitry 818 comprises four flip-flop 1058, 1059, 1060 and 1061 respectively, which receive the BCD output from the decoder 1055, store the data, and pass it on to memory 806 over lines 895 (see FIG. 13b). Lines 895 are tapped into the insufficient funds circuit 820 over lines 1062. The "Descending Register Full" circuit of status circuitry 872 is tapped into lines 895, and is fed via line 1063. The latter circuit receives a signal which locks out of the combination lock when the descending register is full. FIG. 23 illustrates the aforementioned insufficient postage decoder circuit 820 and the Descending Register Full circuit of circuitry 872.

FIG. 23 also shows the arithmetic control circuit 1066, which supplies to clear carry and preset carry signals to the arithmetic circuit 816. The clear carry signal is carried over line 1064, and the preset carry signal is carried over line 1065, to the carry control flip-flop 1057 (FIG. 22).

Figure 25:
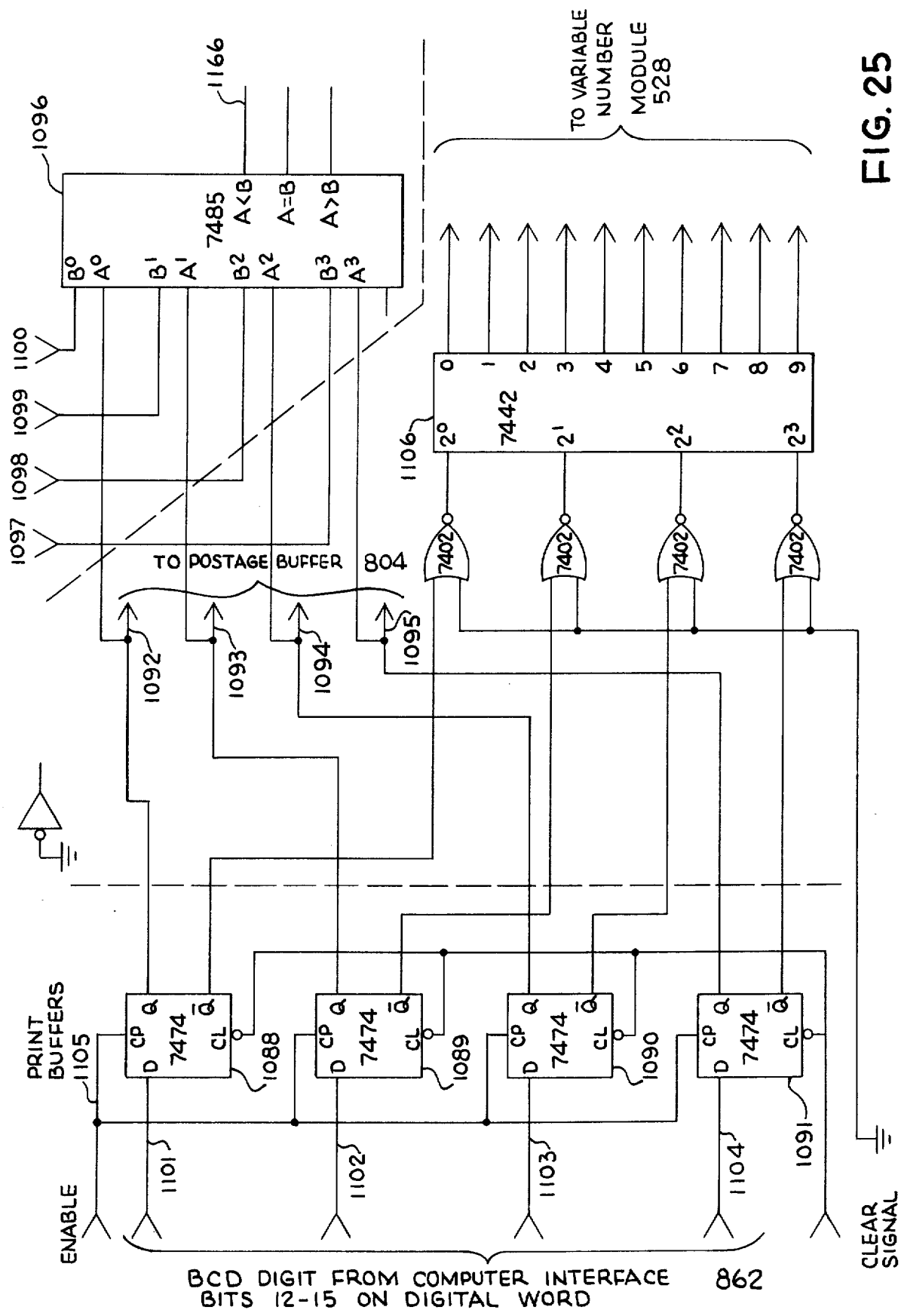

FIG. 24 depicts the postage buffer circuit 804. The outputs from the print buffers of FIG. 25 are stored in a plurality of latches of postage buffer circuit 804. There are four sets of four latches as shown by arrows 1067, 1068, 1069 and 1070. Each set of four latches stores the postage amounts from $0.01 to $10.00 as shown. Each set of latches respectively feeds to a multiplexer (multiplexers 1071, 1072, 1073 and 1074, respectively). These multiplexers select one BCD digit at a time from its corresponding set of latches. These multiplexers feed to another row of multiplexers 1075, 1076, 1077 and 1078, respectively. The function of multiplexers 1075, 1076, 1077 and 1078 is to select the postage amount, the nine's complement of the postage amount, or zero. The nine's complement of the postage amount is used to effect the subtraction of the postage amount from the descending register during the enter postage mode through an addition process. The selection of the zero is, for example, to propagate carry through higher order decimal places, and to leave register contents unchanged during cycle (see FIG. 16). The outputs from the multiplexers 1075, 1076, 1077 and 1078, are respectively fed to the arithmetic circuit 816 over lines 1051, 1052, 1053 and 1054.

Multiplexers 1075, 1076, 1077 and 1078 are controlled by the inputs fed over lines 1079 and 1080 from the multiplexer control circuit 1081 of FIG. 23. Multiplexers 1075, 1076, 1077 and 1078 select the proper postage amount, nine's complement thereof, or zero for each of the three registers (ascending, descending, and piece counter) during the enter postage, add funds, and cycle modes as shown in FIG. 16. Multiplexers 1071, 1072, 1073 and 1074 are controlled by outputs A and B of the memory addressing counter 828 (FIG. 17) to select the $0.01, $0.10, $1.00 and $10.00 digits from the postage buffer circuit 804 at the same time the corresponding digits are being accessed from the ascending register 808 and descending register 810 (FIG. 13B). The inputs fed over lines 1082 and 1083 derived from the outputs of the first two flip-flops 1010 and 1011 of the synchronous 5-bit counter 828.

The multiplexers 1075, 1076, 1077 and 1078 are fed with added funds over lines 1084, 1085, 1086 and 1087. In this case, the digit 5 is transmitted over lines 1084, 1085, 1086 and 1087 and added to the descending register in the $100's position selected by the multiplexer control logic 1081 (see FIG. 23) to give an added fund increment of $500.

Figure 27:
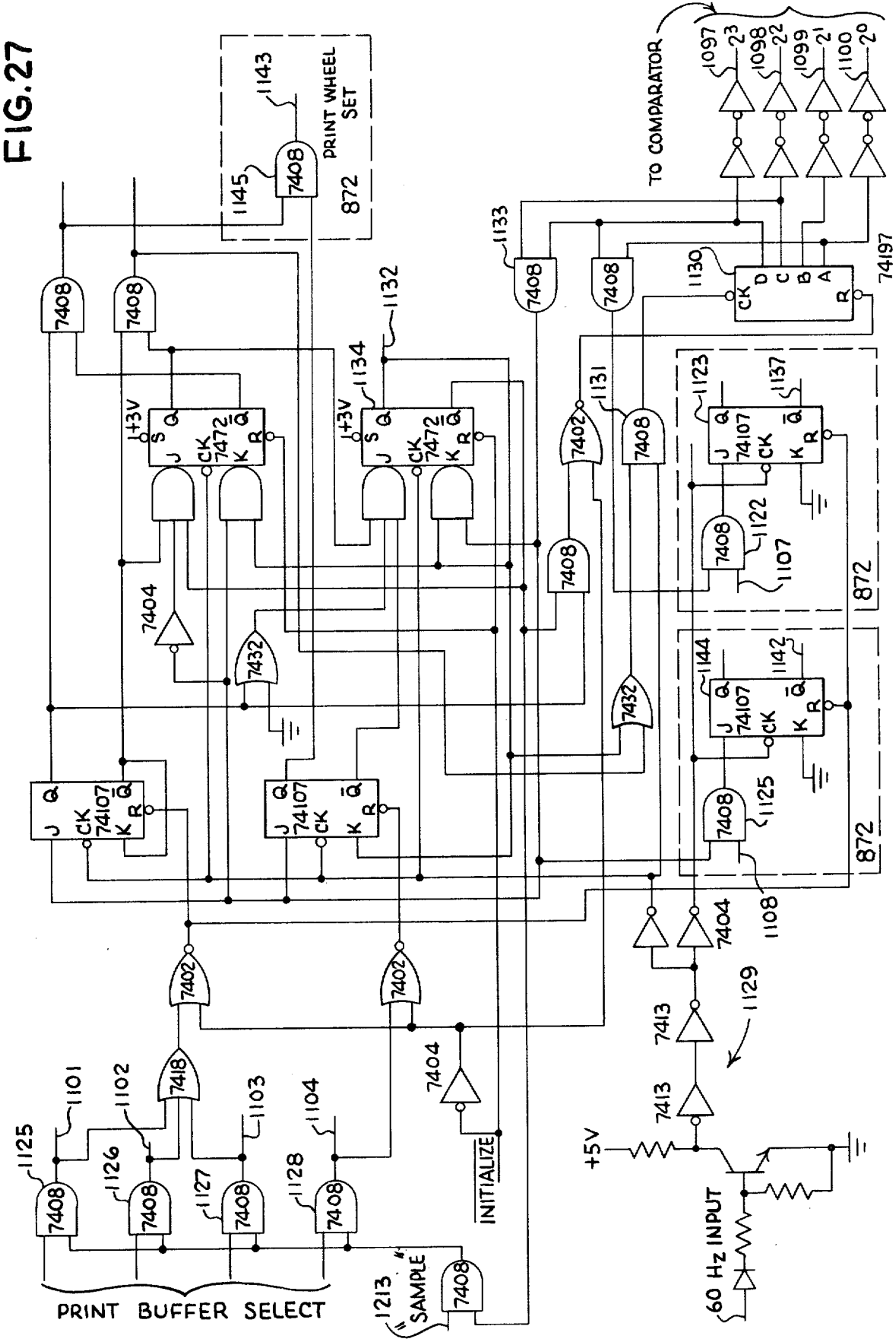
Figure 28:
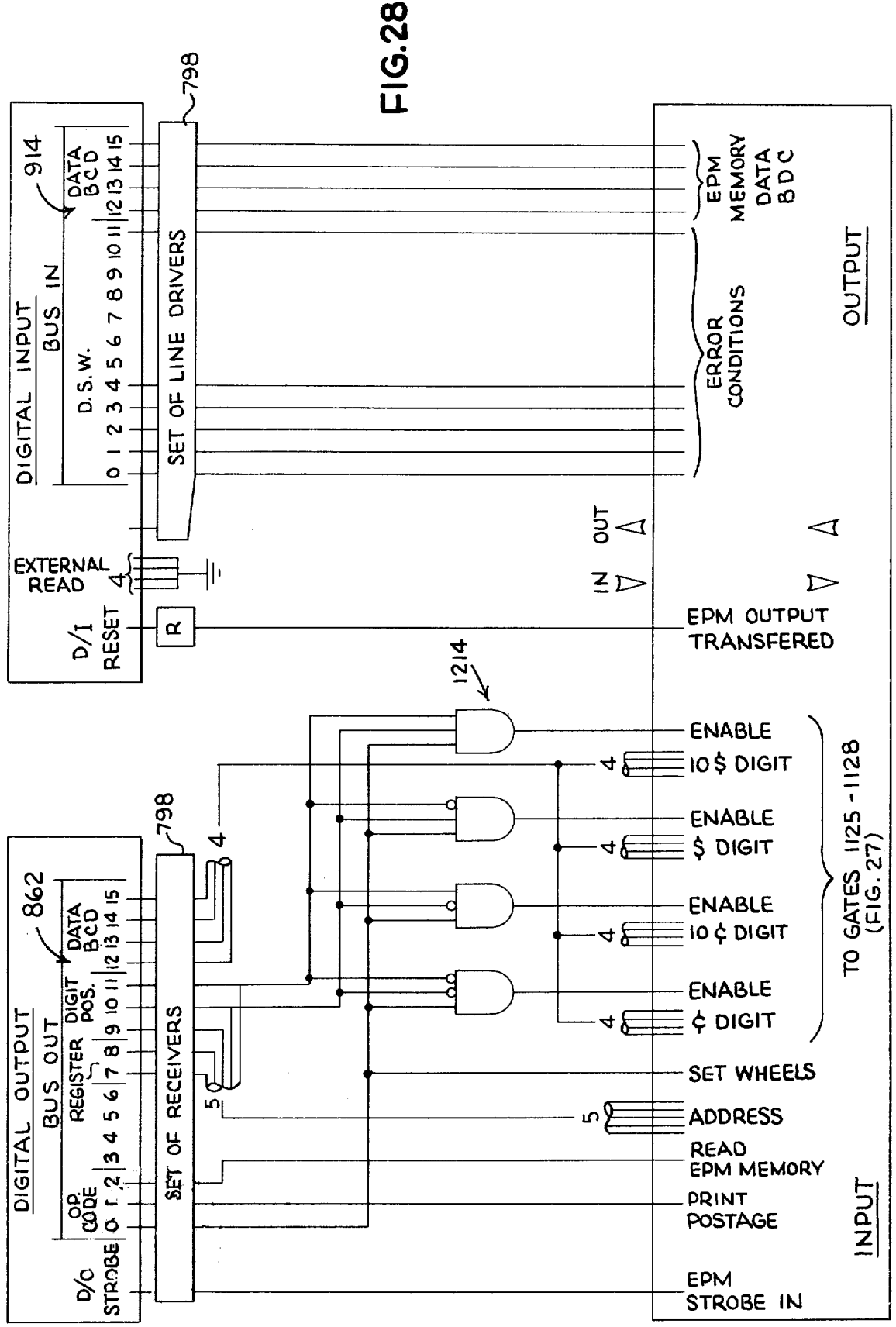

FIG. 25 shows the print buffer circuitry feeding the postage buffer circuit 804. The print buffer circuit comprises four banks (only one shown here) of four D-type flip-flops 1088, 1089, 1090 and 1091, each. Each bank of four flip-flops 1088, 1089, 1090 and 1091 inputs one set of four latches in postage buffer circuit 804, over lines 1092, 1093, 1094, 1095 as shown. The signals fed over these lines are also fed to a comparator 1096 to check for BCD errors. The comparator is also fed from the 4-bit counter of FIG. 27 over lines 1097, 1098, 1099 and 1100. Flip-flops 1088, 1089, 1090 and 1091 receive BCD digit data 862 from the computer; strobe pulses for entering the data into the print buffer are generated by gates 1125, 1126, 1127 and 1128 and are outputted over lines 1101, 1102, 1103 and 1104 (FIG. 27) to print buffer (consisting of 1088, 1089, 1090 and 1091) enabling lines 1105 (FIG. 25) to enter $0.10, $0.10, $1.00, $10.00 digits respectively. As shown in FIG. 28 the BCD data is on bits 12 through 15 of the digital word.

The outputs of each bank of flip-flops 1088, 1089, 1090 and 1091 are fed to a 4-to-10 line decoder 1106, whose outputs feed a series of electrical contacts corresponding to various positions on the variable number modules 528 of FIG. 8. The decoder provides low signal on the contact corresponding to the position to be selected. These electrical contacts are sensed by a wiper arm on each module.

Figure 26:
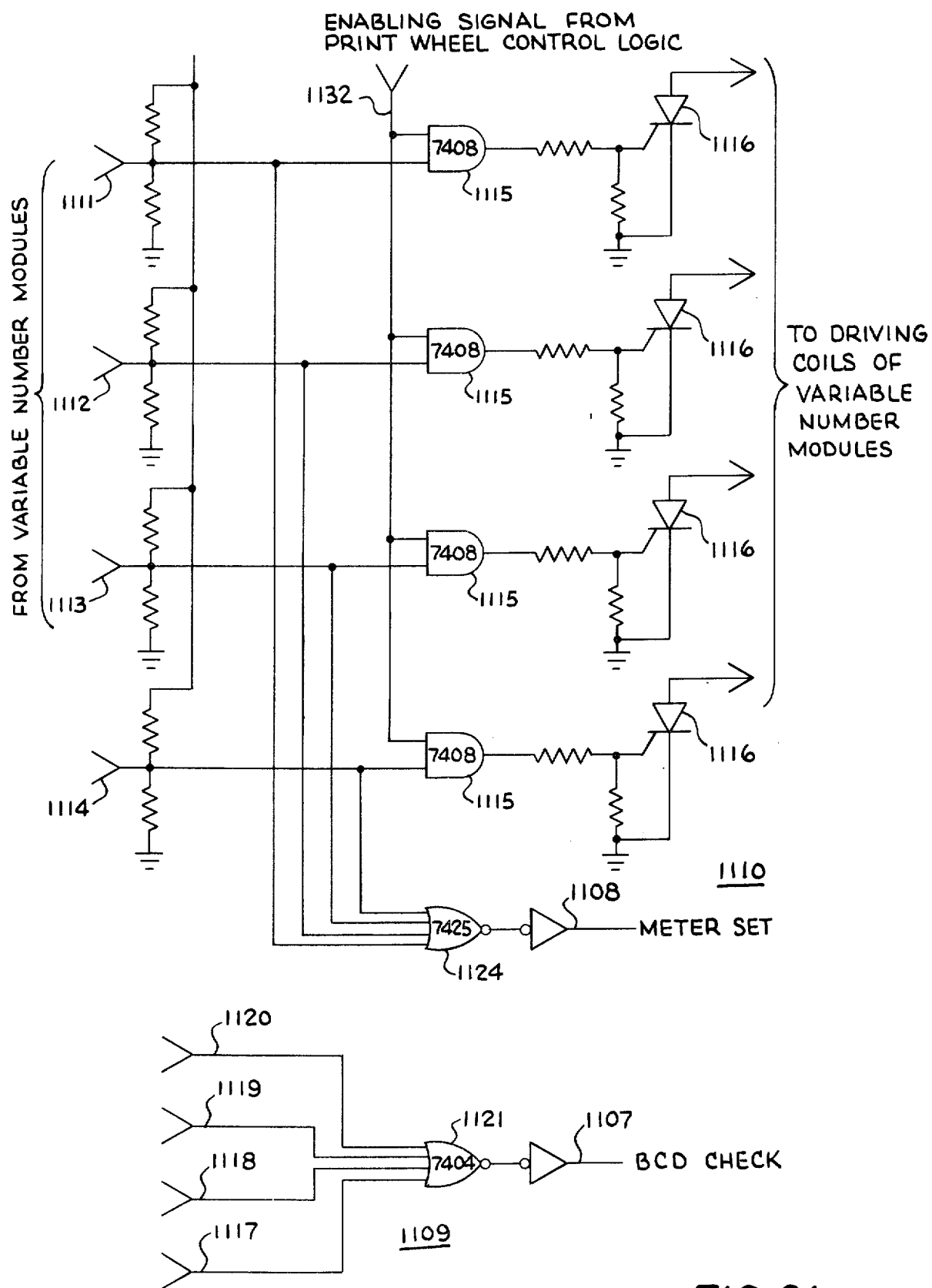

FIG. 26 illustrates circuits 1109 and 1110. Circuit 1110 is inputted on lines 1111, 1112, 1113 and 1114, which connect to each wiper arm (commutative brush) on the rotative elements of the variable number modules 528. When a high signal is sensed by a wiper arm, indicating a wrong wheel position, the signal is carried over the appropriate input line (1111, 1112, 1113 and 1114) to a respective gate 1115, thus enabling the gate and turning on a respective SCR 1116. Each respective SCR 1116 is connected to a driving coil of one of the variable number modules for rotating the number wheels to the proper position. When the appropriate position is reached, a low signal is detected by the wiper arm, which is subsequently fed back through one of the lines 1111, 1112, 1113 and 1114 to disable the respective gate 115 and turn off the respective SCR 1116.

Circuit 1109 is fed from line 1166 of each comparator 1096 of FIG. 25, (only one of four circuits shown) over lines 1117, 1118, 1119 and 1120, respectively. The lines feed to a gate 1121, which checks for the Binary Coded Decimal and provides an output on line 1107. Line 1107 feeds to gate 1122 in FIG. 27 as shown. Gate 1122 and J-K flip-flop 1123 are part of the interrupt and status indicator circuitry 872.

Figure 29:
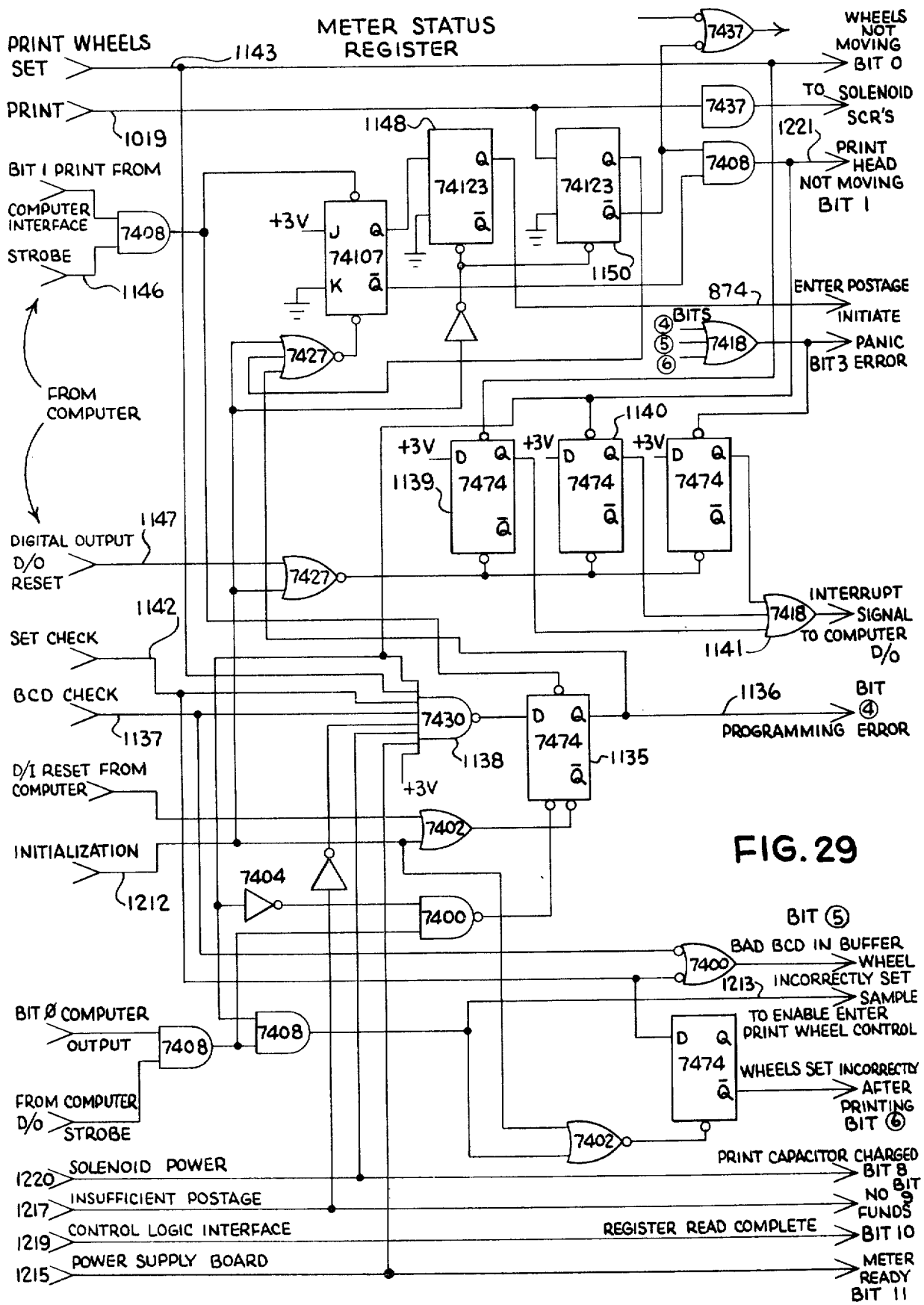

The gate 1124 of circuit 1110 is connected to each of lines 1111, 1112, 1113 and 1114, and is used for checking whether the print wheels of the variable number modules are in the set position. The output of gate 1124 is fed over line 1108 to gate 1125 of the interrupt and status circuitry 872 as shown in FIG. 27. The outputs of flip-flops 1144 and 1123 form part of the feed back to the computer through the meter station register (FIG. 29).

FIG. 27 depicts the print wheel logic circuitry. The print buffer to be loaded is selected by bits 10 and 11 of the digital output (FIG. 28). AND gate 1214 (FIG. 28) decode bits 10 and 11 as specifying $0.01, $0.10, $1.00, $10.00 digits and feeds the appropriate enabling signal to gates 1125–1128 (FIG. 27). A sampling pulse to gates 1125–1128 generates a strobe signal on one of the otuputs 1101–1104 which goes to the appropriate print buffer enabling lines 1105 (FIG. 25) which causes data present on the digital output 862 (FIG. 28) to be entered into the print buffer (flip-flop 1088–1091 in FIG. 25).

The print wheel logic circuit has pulse generating means (arrow 1129) to generate a 60 $H_z$ square wave signal which operates a counter 1130 via an enabling gate 1131. The counter 1130 provides twelve pulses for operating the print wheels. The print wheels only require a maximum of 10 pulses, so that there are several superfluous pulses. This over abundance of pulses is planned, so that all the wheels will be set with assurity. If a wheel does not obtain the proper position after the twelfth pulse this will be sensed and indicated on the display as an error condition as aforementioned.

The counter 1130 feeds the pulses through a decoding gate 1133 to flip-flop 1134. Flip-flop 1134 passes an enabling signal to the gates 1115 of FIG. 26 over line 1132 to turn on the SCRs.

The meter status register (FIG. 29) is the means by which the meter communicates with the computer controlling it. It performs three functions: (1) transfer of data (2) indication of status (3) indication of error conditions. Bits 12–15 (not shown in FIG. 29) are used to transfer data from meter memory to the computer. Status indicators include:

| | | |
|---|---|---|
| Print wheels not moving | (bit 0) | line 1143 |
| Print head not moving | (bit 1) | line 1221 |
| Print capacitor changed | (bit 8) | line 1220 |
| No funds | (bit 9) | line 1217 |
| Register reads complete | (bit 10) | line 1219 |
| Meter ready | (bit 11) | line 1215 |

"Print head not moving" and "print wheels set" set flip-flops 1140 and 1139 respectively which generates interrupts through gate 1141. This relieves the computer of the necessity of waiting in a loop for the duration of the slow mechanical operations involved.

Normally in operating the meter, 4 BCD digits would be outputted to the print buffers, the meter printer would set to the number, the computer would check the meter to see that sufficient postage was available, then issue a print command. The computer would not issue another "set" or "print" command until after the meter has had time to complete the previous operation. The meter is logically locked out from attempting any operation not "well defined". Any such operation sets flip-flop 1135 which outputs a signal on line 1136 to bit 4 (line 1135) of the digital input which indicates a programming error. Examples of such errors are: issuing a print command (a) before the print wheels have finished setting (b) while the print head is moving (c) when there is a setting error (d) when BCD is not in the print buffers (e) when there is insufficient postage in the meter (f) when the printer power supply is not ready and (g) when the meter is not ready. Such an error also generates an interrupt which signals the computer to read the status register and go into a routine to handle this — some error conditions could be handled by computer programming, others would require human intervention. Bit 5 is another error message — non BCD characters in a print buffer. Bit 6 comes up if the print wheels should change position due to the impact of printing.

One-shot 1148 provides a clock signal to the polling circuit of FIG. 18. This 1 sec signal is carried by line 874 to flip-flop 1035 (FIG. 18) to initiate the enter postage mode.

One-shot 1150 provides a dummy signal of 50 ms duration to indicate the print head return. However, the print head can actually be monitored by means of a switch, thus eliminating the need for one shot 1150 if so desired.

Figure 30:
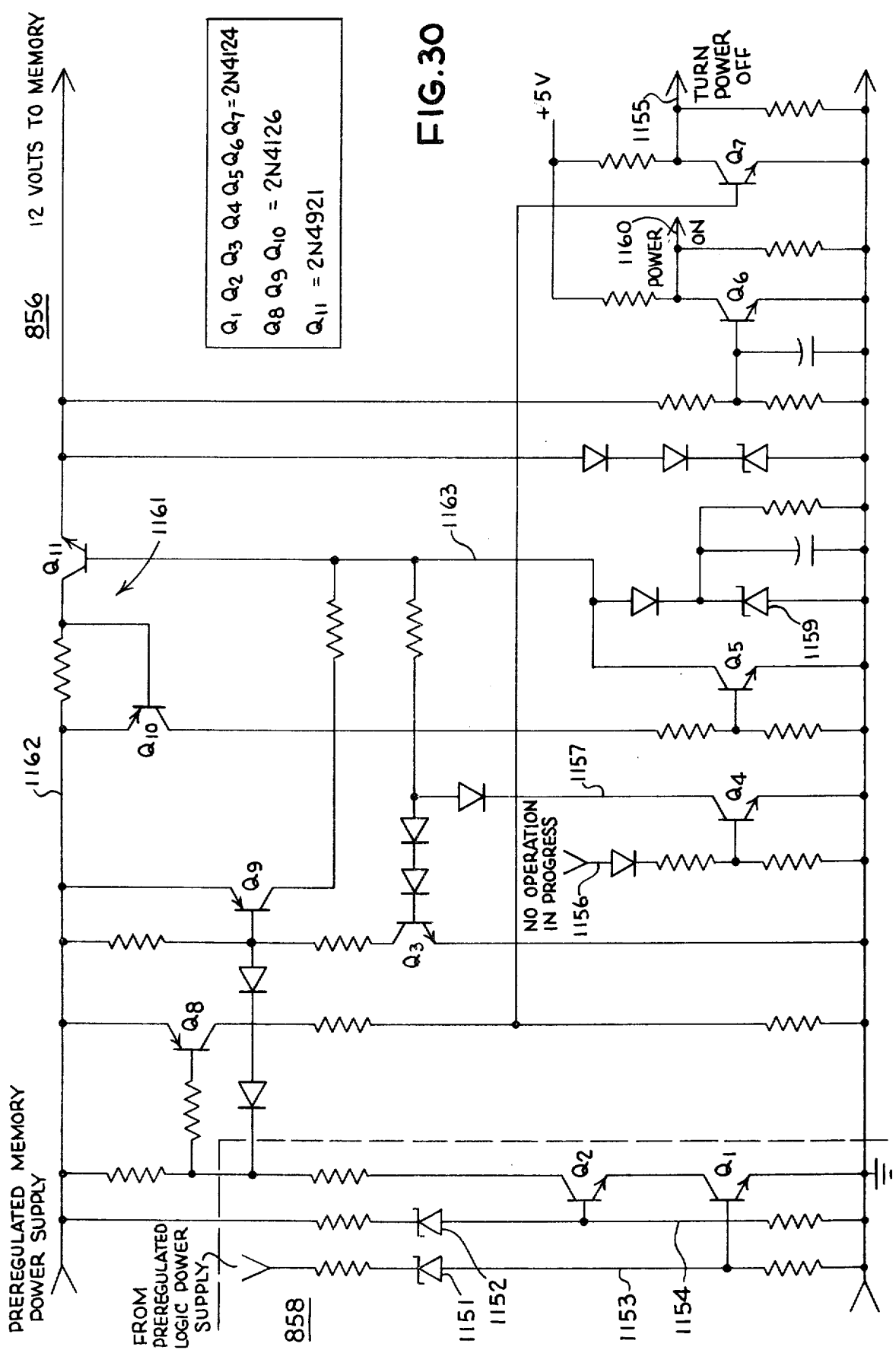
Figure 31:
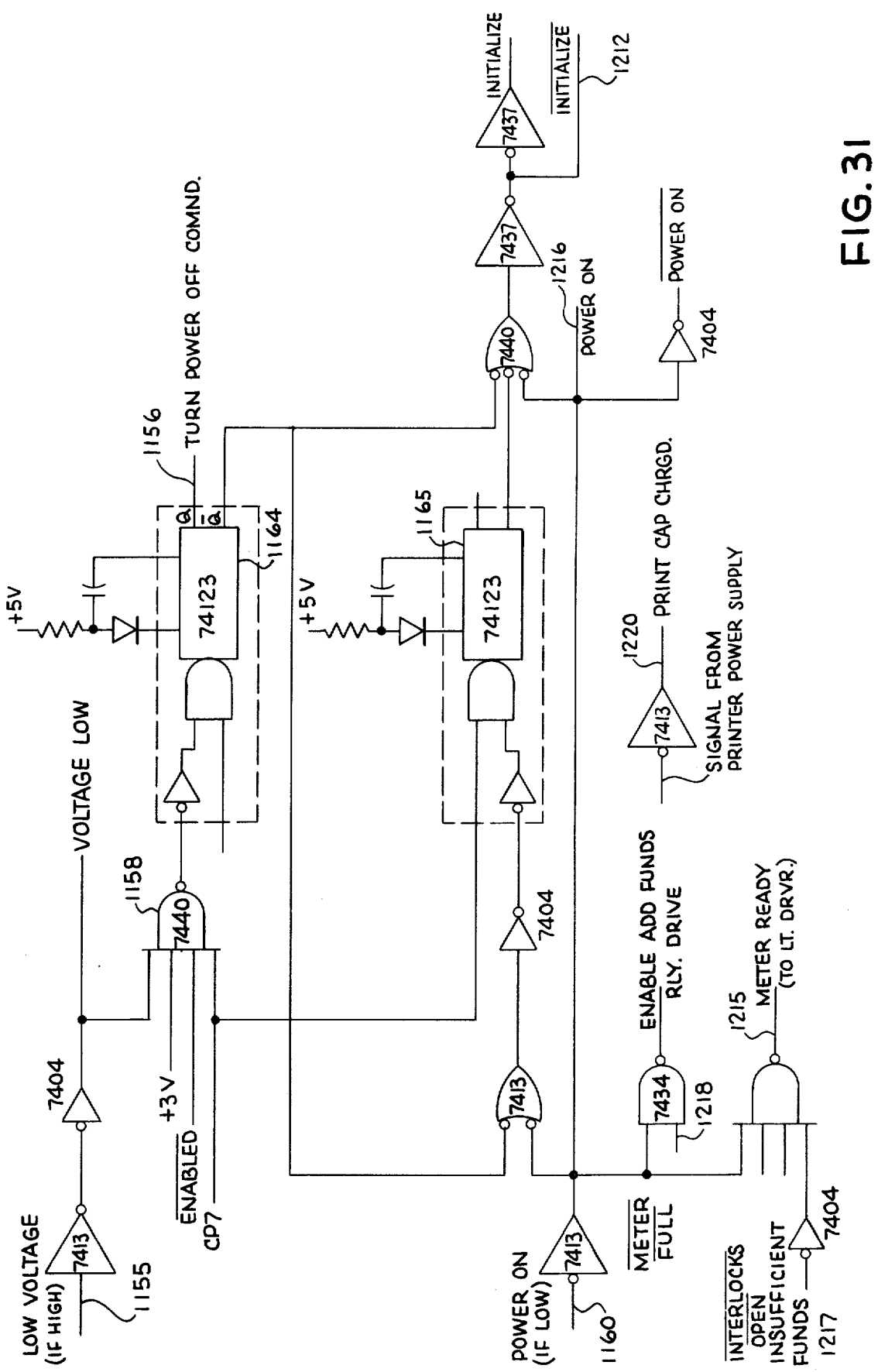

FIG. 30 shows the circuitry for the memory power supply 856, and the voltage sensing circuit 858. The voltage sensing circuit 858 comprises two zener diodes 1151 and 1152, respectively. The zener diode 1151 is used to monitor the voltage level before the regulator to the logic circuitry, and the zener diode 1152 is used to monitor the voltage level before the regulator means 1161 to the memory. When the voltage level drops below a desired level in either lines 1153 or 1154, one of the transistors $Q_1$ or $Q_2$, as the case may be, will turn off. When either $Q_1$ or $Q_2$ turns off, $Q_8$ will be caused to become non-conducting, which in turn causes $Q_7$ to turn off. This results in a low signal appearing on line 1155. This low signal is fed over line 1155 to the control power supply and initialization circuit 844 of FIG. 31. If there is no operation being performed in the meter, (for example, add funds) when this low signal is received, then a command to turn power off is given on line 1156 (FIG. 31). This command is then conveyed over line 1156 to the power circuit of FIG. 30 where it turns on transistor $Q_4$. When transistor $Q_4$ becomes conducting, current is drawn in line 1157, thus turning off transistor $Q_3$. This causes transistor $Q_9$ to become non-conducting, if transistors $Q_1$ and $Q_2$ are also non-conducting. Transistors $Q_1$ and $Q_2$ are assumed to be turned off because they initiated the start of the power-off condition. Transistor $Q_9$ will now influence transistor $Q_{11}$ to turn off, thus depriving the memory of power.

On the other hand, if an operation is being performed in the meter when the low signal is received on line 1155, then gate 1158 (FIG. 31) will remain disenabled until the operation is completed. This will prevent the command to turn off power on line 1156 until the operation is completed.

Zener diode 1159 (FIG. 30) acts to regulate the voltage going to the memory. Above the 12 volt level, the zener diode 1159 conducts, clamping the output of transistor $Q_{11}$ at about 12 volts.

Transistor $Q_{10}$ and $Q_5$ are used in a current limiting circuit to protect the memory power supply. If too much current is drawn in line 1162, transistor $Q_{10}$ becomes conducting which in turn causes transistor $Q_5$ to turn on. Current is reduced in line 1163 which starts turning off transistor $Q_{11}$ thus limiting the current in line 1162 to a safe value.

Transistor $Q_6$ is used to provide a "power-on" signal on line 1160 which is fed to the control power supply and initialization circuit 844 of FIg. 31.

FIG. 31 illustrates the control power supply and initialization circuit 844 as aforementioned. Elements 1164 and 1165 are "one-shots." The one-shot 1164 supplies the "turn-power-off" command carried on line 1156 as previously discussed. The one-shot 1165 supplies the initialization signal used to preset logic elements on start-up including the flip-flop that initiates the cycle mode on start-up.

Figure 32:
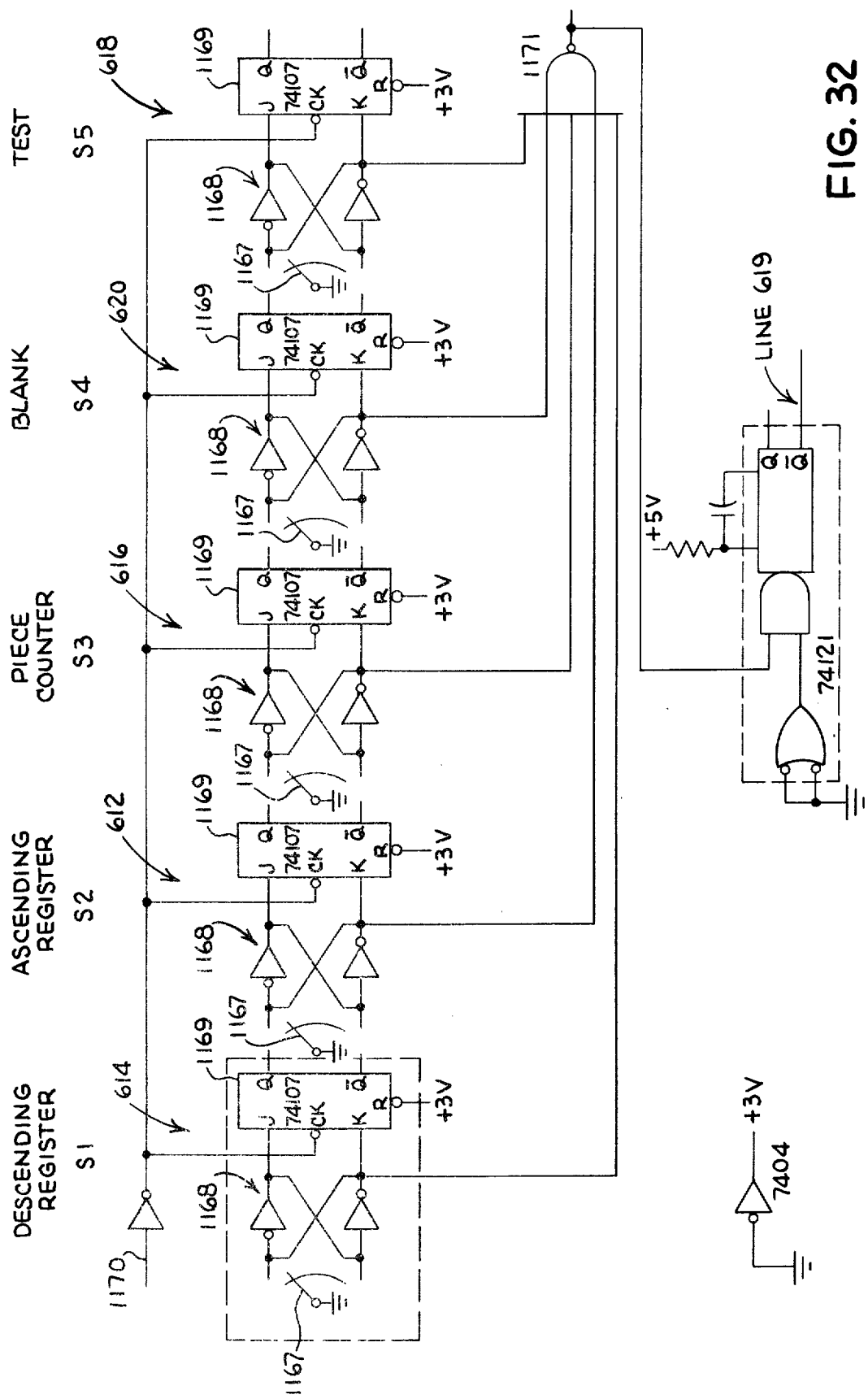

FIG. 32 depicts the circuitry for the display selector switches 612, 614, 616, 618 and 620. Each switch circuit acts as a buffer register which stores the information. Each switch circuit comprises a single pole double throw switch 1167, a well known debouncing circuit 1168, and a "J-K" flip-flop 1169. Only one switch can be thrown at one time; the switches are mechanically exclusive.

Information is transferred to the flip-flops 1169 when the system is not operating in any of the three modes.

The outputs from these circuits are, therefore, well defined (i.e. constant) during the cycle mode.

The gate 1171 generates a signal every time a switch is depressed. The signal is carried on line 619 to the Cycle mode circuit of FIG. 18.

A switch clock signal is introduced on line 1170 which synchronizes reading the manually operated switches into the J-K flip-flops with the clock controlled meter operation. The switch clock signal is generated by the switch clock circuit 1172 of FIG. 33. This signal will only be generated when there is no run signal, and the addressing counter is at zero.

The display used in this postage meter system is a standard Hewlett-Packard display, (No. 5082-7300) which has latches and decoder built-in.

Figure 33:
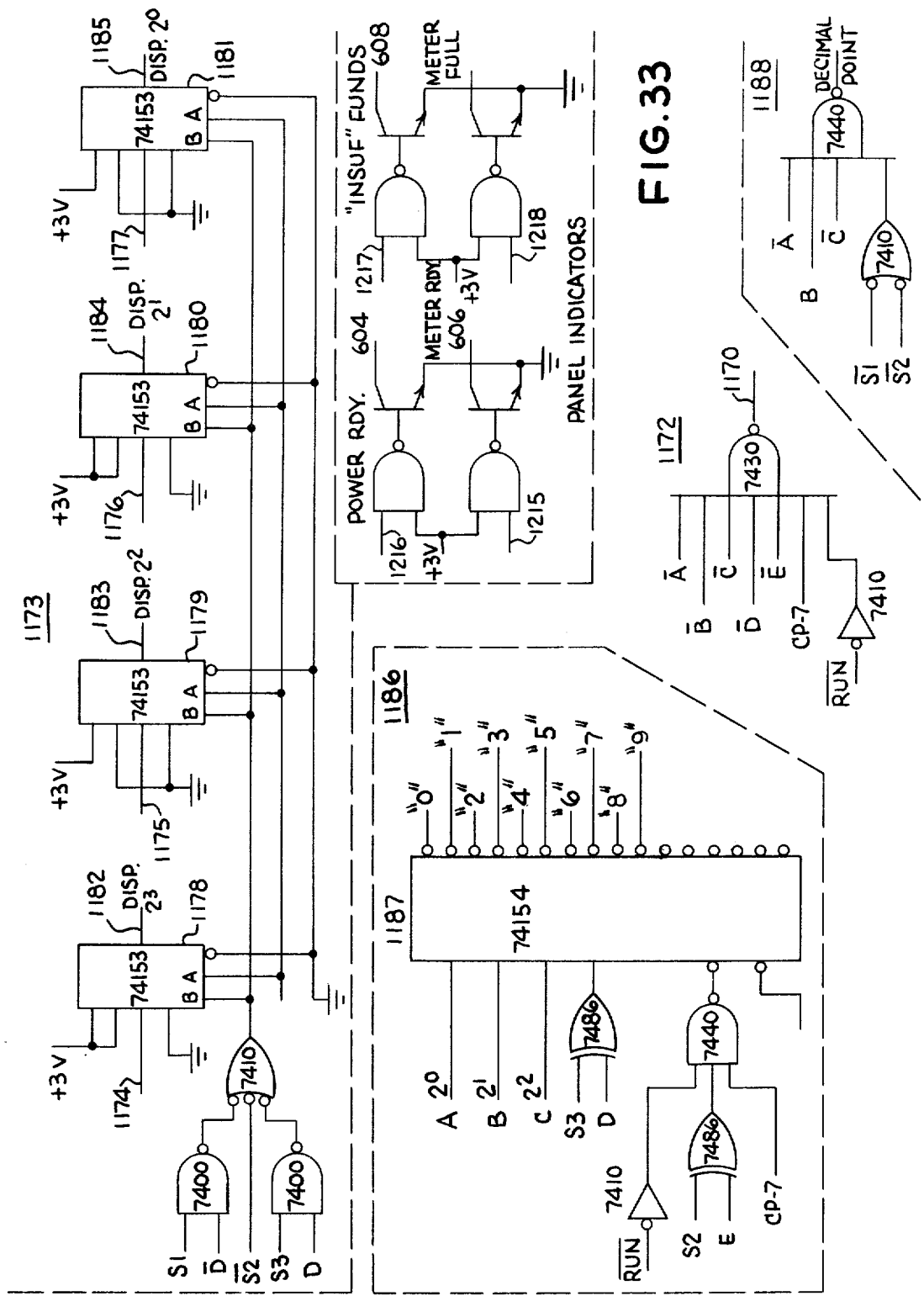

The multiplexer circuitry 1173 of FIG. 33 gates data from the memory to the display, and also blanks and tests the display. The multiplexer elements 1178, 1179, 1180 and 1181 receive memory data from the arithmetic unit output buffer 818 (FIG. 22) over lines 1174, 1175, 1176 and 1177 respectively.

In the display mode the memory data is outputted to the display inputs over lines 1182-1185 one BCD digit at a time. Circuit 1186 of FIG. 33 generates clock signals to enter data into the appropriate display latch. The "0" output of 1186 clocks data into the least significant number display and "9" output into the most significant number display.

Because the memory only stores numbers, there is need for a circuit to select the decimal point in the display. Circuit 1188 is such a circuit, and is shown in FIG. 33.

The panel indicator circuits 604, 606 and 608 (lamp drivers) are also illustrated in FIG. 33.

Figure 34:
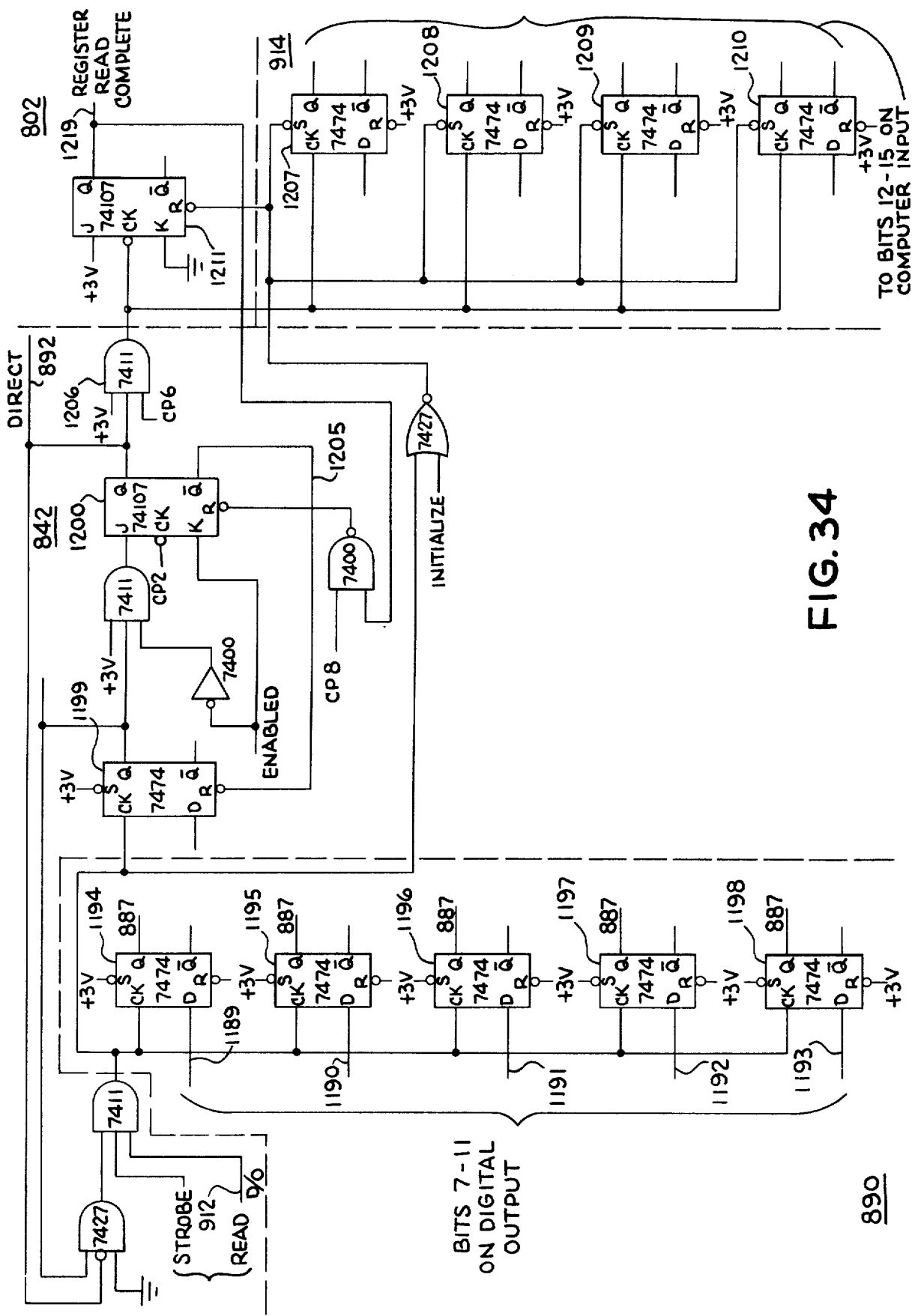

FIG. 34 shows the direct memory read control logic circuitry, which transfers address data to the memory control logic circuitry of FIG. 21.

Bits 7 through 11 on the digital output from the computer (see FIG. 28) is placed on lines 1189, 1190, 1191 1192 and 1193 of buffers 1194, 1195, 1196, 1197 and 1198, respectively. When the "read memory" command is given on line 912, flip-flop 1199 is set, provided that the system is not in the middle of a mode. The buffers 1194, 1195, 1196, 1197 and 1198 transfer the address data on line 887 to gates 888 of circuit 1041 of FIG. 21.

On clock pulse 2, flip-flop 1200 provides a "direct" signal on line 892 of circuit 1041 which enables these gates, and the address data is transferred to the buffers 1201, 1202, 1203 and 1204 of circuit 1045 via the memory of FIG. 20. Clock pulse 2 also clears flip-flop 1199 via line 1205 from flip-flop 1200.

On clock pulse 6, gate 1206 is enabled, and buffers 1201, 1202, 1203 and 1204 transfer to latches 1207, 1208, 1209 and 1210 which feeds into interface circuit 914 (FIG. 28).

Flip-flop 1211 (FIG. 34) is set on clock pulse 6 indicating that "read" has been completed. Flip-flop 1211 is left "high" after the meter is read. An interrupt signal is also provided in circuit 872 as a result. This notifies the computer that the read operation has been carried out and the information requested is present on the digital input to the computer.

On clock pulse 8, flip-flop 1200 is cleared, resetting the circuitry for a new read operation.

It will now be appreciated that this invention provides a secure postage metering device which uses a computer-compatible piggy-back-mounted postage printer and electronic digital postal accounting techniques, and is therefore suitable for use in computer-controlled, high-speed-printer-implemented, high volume mailing operations.

Since the foregoing description and drawings are merely illustrative, the scope of protection of the invention has been more broadly stated in the following claims; and these should be liberally interpreted so as to obtain the benefit of all equivalents to which the invention is fairly entitled.

What is claimed is:

1. In the combination of a computer and metering means arranged to print a numerical amount, said metering means including means for receiving from said computer a signal designating said amount, printing means responsive to said signal receiving means, an addressable memory for storing a balance, an arithmetic unit responsive to said memory and said signal receiving means to alter said balance by said computer-designated amount each time said printing means is actuated, memory addressing means for fetching a present balance from a predetermined memory address and conveying it to said arithmetic unit for said balance altering operation and loading the new balance resulting from such operation back into said same memory address, said memory addressing means comprising:

a pulse stream source, a first counter responsive to said pulse stream, a gate responsive to said first counter, a second counter responsive to said gate, means for selecting a memory address in response to said second counter, means for detecting the beginning of a count sequence of said first counter, means for detecting the end of a count sequence of said second counter, and means responsive to both said count sequence detecting means for enabling said gate to start a memory addressing count sequence of said second counter at the beginning of said first count sequence, and for disabling said gate at the end of said memory addressing count sequence.

2. An electronic postage meter comprising:
input means for inputting postage data into said postage meter;
a postage printing means operatively connected to said input means and responsive to said inputted postage data for printing postage to be issued; and
accounting means operatively connected to the postage printing means for monitoring the postage printing means so that an accounting is kept of the postage that is being issued by said printing means, said accounting means having a non-volatile memory for storing postal data, said non-volatile memory being resistive to attempts at erasing said postal data therefrom, so that said accounting means is protected from attempts to erase the accounting of printed postage.

3. The electronic postage meter of claim 2, further comprising electrical disruption means operatively connected to the accounting means for sensing when the accounting means is subjected to changes in voltage effecting the accountability of said accounting means.

4. The electronic postage meter of claim 2, futher comprising control means operatively connected between the postage printing means and the accounting means for controlling the operation of the accounting means and the printing means such that a printing of postage cannot be accomplished without being accounted for by said accounting means.

* * * * *

UNITED STATES PATENT OFFICE
CERTIFICATE OF CORRECTION

Patent No. 3,938,095          Dated February 10, 1976

Inventor(s) Frank T. Check, Jr.; Alton B. Eckert, Jr.; Bruce E. Hinman; Howell A. Jones, Jr.; Raymond R. Lupkas and Robert B. McFiggans It is certified that error appears in the above-identified patent and that said Letters Patent are hereby corrected as shown below:

```
Column 1, line 47, remove "3,255,439" and insert --or--.
Column 2, line 56, remove "means" and insert --measures--.
Column 3, line 65, change "elevation" to --elevational--.
Column 4, line 10, change "polling" to --and--.
Column 7, line 27, change "under" to --number--,
          line 65, change "are" to --and--.
Column 9, line 66, change "422" to --442--.
Column 10, line 5, change "422" to --442--.
Column 11, line 13, change "314,2" to --314.2--.
Column 17, line 46, change "loocking" to --locking--,
           line 53, change "500.2" to --500.8--.
Column 18, line 24, change "punches" to --punched--.
Column 19, line 30, change "746" to --846--.
Column 21, line 58, change "debounding" to --debouncing--.
Column 24, line 12, change the first occurrence of "$0.10"
      to --$0.01--,
           line 38, change "115" to --1115--.
Claim 4, line 1, change "futher" to --further--.
```

Signed and Sealed this eleventh Day of May 1976

[SEAL]

Attest:

RUTH C. MASON
*Attesting Officer*

C. MARSHALL DANN
*Commissioner of Patents and Trademarks*

UNITED STATES PATENT AND TRADEMARK OFFICE
CERTIFICATE OF CORRECTION

PATENT NO. : 3,938,095

Page 1 of 2

DATED : February 10, 1976

INVENTOR(S) : Frank T. Check, Jr., Alton B. Eckert, Jr., Bruce E. Hinman, Howell A. Jones, Jr., Raymond R. Lupkas, Robert B. McFiggans It is certified that error appears in the above—identified patent and that said Letters Patent is hereby corrected as shown below:

In the drawings, sheet 3, figure 6, the reference numeral "436" on the upper left sprocket holes should be --426--. On sheet 4, figure 7, the number "444" in the upper left should be --446--. On sheet 7, figure 11, the label "Locked Switch Actuator" on the knob 599 should be --Lock Switch Actuator--. On sheet 9, figure 13B, lines 916 and 921 and the accompanying labels "ON" and "OFF" should terminate in the memory address decoder 814 instead of the memory 806. On sheet 10, fig. 13C, the label of block 616 should be changed from "Piece Control" to --Piece Counter--. On sheet 11, figure 13D, the reference numeral of the gate in the bottom of the figure should be changed from 952 to 952A. On sheet 14, figure 17, a connection dot should be placed in the intersection of the line 831 extending between block 830 and flip-flop 1012, and the lines extending between the clock terminals of flip-flops 1011 and 1013. On sheet 23, figure 26, the bracket labeled "From Variable Number Modules" should be extended to include the input 1114. In the specification: Column 1, line 54, delete the ".". Column 2, line 16, change "guaranteeing" to --means--; line 7, change "gauranteeing" to --guaranteeing--. Column 6, line 10, change "manufactures" to --manufacturers--; line 13, change "avoid" to --void--. Column 7, line 3, change "2,692,988" to --3,692,988--; line 33, change "mechanism" to --mechanisms--. Column 10, line 1, change "422" to --442--; line 58, change "undeside" to --underside--. Column 11, line 19, change "solenoidactuated" to --solenoid-actuated--. Column 12, line 45, change "FIG. 8" to --FIG. 12--. Column 15, line 60, change "866" to --807--. Column 17, lines 45, 50, 51 and 66, change "952" to --952A--. Column 18, line 11, following "recharging" insert a --,--; line 25, change "keyboardentered" to --keyboard-entered--; line 60, change "No. 1" to --No. 3--. Column 20, line 22, omit the second

UNITED STATES PATENT AND TRADEMARK OFFICE
CERTIFICATE OF CORRECTION

PATENT NO. : 3,938,095    Page 2 of 2

DATED : February 10, 1976

INVENTOR(S) : Frank T. Check, Jr., Alton B. Eckert, Jr., Bruce E. Hinman, Howell A. Jones, Jr., Raymond R. Lupkas, Robert B. McFiggans It is certified that error appears in the above—identified patent and that said Letters Patent is hereby corrected as shown below:

comma at the end of the line. Column 22, line 52, change "outputs" to --output--; line 64, change "flip-flop" to --flip-flops--. Column 24, line 55, change "station" to --status--. Column 25, line 27, change "changed" to --charged--; line 46, change "1135" to --1136--. Column 26, line 50, change "FIg" to --FIG.--.

Signed and Sealed this

Seventh Day of May 1985

[SEAL]

Attest:

DONALD J. QUIGG

*Attesting Officer*    *Acting Commissioner of Patents and Trademarks*